US012790853B1

(12) United States Patent
Trent et al.

(10) Patent No.: US 12,790,853 B1
(45) Date of Patent: Nov. 10, 2026

(54) LOCK WITH PRIMARY AND AUXILIARY LOCKING MECHANISMS AND CORRESPONDING KEYS

(71) Applicant: ASSA ABLOY HIGH SECURITY GROUP INC., Salem, VA (US)

(72) Inventors: Douglas Trent, Roanoke, VA (US); Mark Benzie, Roanoke, VA (US); Christopher Elliott, Hollins, VA (US)

(73) Assignee: ASSA ABLOY HIGH SECURITY GROUP INC., Salem, VA (US)

( * ) Notice: Subject to any disclaimer, the term of this patent is extended or adjusted under 35 U.S.C. 154(b) by 0 days.

(21) Appl. No.: 19/434,827

(22) Filed: Dec. 29, 2025

(51) Int. Cl.
*E05B 27/00* (2006.01)
*E05B 27/08* (2006.01)
*E05B 27/10* (2006.01)

(52) U.S. Cl.
CPC ...... *E05B 27/0042* (2013.01); *E05B 27/0053* (2013.01); *E05B 27/083* (2013.01); *E05B 27/10* (2021.08)

(58) Field of Classification Search
CPC .. E05B 27/0042; E05B 27/10; E05B 27/0053; E05B 27/083
See application file for complete search history.

(56) References Cited

U.S. PATENT DOCUMENTS 6,945,082 B2 9/2005 Field et al.
7,412,860 B1 * 8/2008 Field .................. E05B 19/0029 70/420
7,552,608 B2 6/2009 Field et al.
7,788,956 B2 9/2010 Field et al.
8,186,194 B2 5/2012 Field et al.
9,359,793 B2 6/2016 Field et al.
11,624,206 B2 4/2023 Benzie et al.
12,077,983 B2 9/2024 Duckwall et al.
2005/0172688 A1 * 8/2005 Widen ................ E05B 27/0082 70/495
2006/0027006 A1 * 2/2006 Di Vito ............... E05B 27/0042 70/409
2006/0207303 A1 * 9/2006 Almagor ................. E05B 27/00 70/409
2007/0220937 A1 * 9/2007 Eden, Jr. ............. E05B 27/0042 70/409
2009/0193862 A1 * 8/2009 Alcela Y Bea ..... E05B 27/0017 70/383

(Continued)

*Primary Examiner* — Mark A Williams
(74) *Attorney, Agent, or Firm* — ROTHWELL, FIGG, ERNST & MANBECK, P.C.

(57) ABSTRACT

A keyway of a hierarchical lock system allows two levels of operation within a hierarchical key system. First level keys have a control rib with a control surface to contact a mating control surface of an auxiliary locking mechanism in a first security level cylinder lock. The control surface extends into a control groove of the keyway defining a secondary portion of the keyway. The first level key also operates a second security level lock with the same keyway, but with no auxiliary locking mechanism, as the first and second security level locks have the same primary locking mechanism—such as tumbler pins—extending into a primary portion of the keyway. The keyways of the first and second security level locks have four sections having at least three different widths, and the first level key has a blade profile defining four segments having at least three different widths and conforming to the profiles of the keyways.

12 Claims, 26 Drawing Sheets

(56) References Cited

U.S. PATENT DOCUMENTS

| | | | | |
|---|---|---|---|---|
| 2013/0091910 | A1* | 4/2013 | Dolev | E05B 35/005 70/402 |
| 2013/0091911 | A1* | 4/2013 | Dolev | E05B 27/08 70/402 |
| 2013/0298621 | A1* | 11/2013 | Clifford | E05B 19/0052 70/358 |
| 2017/0081880 | A1* | 3/2017 | Artsiely | E05B 29/00 |
| 2017/0152678 | A1* | 6/2017 | Clifford | E05B 27/0007 |

* cited by examiner

LOCK WITH PRIMARY AND AUXILIARY LOCKING MECHANISMS AND CORRESPONDING KEYS

FIELD OF THE DISCLOSURE

This disclosure relates to cylinder locks and particularly to pin tumbler cylinder locks with an auxiliary locking mechanism and corresponding keys with a control ribs for manipulating the auxiliary locking mechanism.

BACKGROUND

Customers of security lock systems have recognized the importance of having higher security mechanisms on vulnerable doors. The protection offered by these cylinders more than justifies their cost. However, the expense to equip all the doors in a facility with modern higher security cylinders often offsets the potential benefit of having higher security cylinders on nonessential doors. Many customers choose to install and maintain two different master key systems, one for the higher security doors and one for the common, less critical doors, thus having more keys to manage and carry for access.

This has led to the development of so-called hierarchical lock systems. A hierarchical lock system includes one or more higher security cylinders, typically installed on critical, high-risk doors, and associated lower security cylinders installed on less critical doors. The lower security cylinders are "associated" with the higher security cylinders in the sense that a high-security master key, capable of operating the higher security cylinder, is also capable of operating each of the associated lower security cylinders. Lower security keys for operating the associated lower security cylinders are not, however, capable of operating the higher security cylinders with which the cylinders are associated. And any key capable of operating cylinders at one security level is also capable of operating associated cylinders at lower levels, but the keys constructed to operate only lower security cylinders cannot operate higher security cylinders with which the lower security cylinders are associated.

In the context of this description, a standard security cylinder is a cylinder having fewer security features than a higher security cylinder.

Several lock manufacturers currently make cylinders that can be arranged into systems with different levels of physical security. As the industry produces new and higher security products it is advantageous to develop standard security lock cylinders (i.e., non-higher security cylinders) that will interface into systems with the newer higher security cylinders and be operated by the higher security keys. Notwithstanding improvements in the well worked lock art, there remains a need for lock cylinders which offer different levels of protection against criminal attack or other unauthorized entry and which can be arranged into one hierarchical keying schedule. Such lock mechanisms should also resist contemporary lock bypass techniques, and it is desirable that the dimensions of the lock not exceed conventional cylinder size. It is equally important that the components and the lock assembly can be economically mass produced.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The keyway design of the hierarchical lock system described herein will allow two levels of operation within a hierarchical key system. First level keys will have a control rib with a control surface to align and contact with a mating control surface of an auxiliary locking mechanism in a first security level cylinder lock. The first level key will also operate a second security level cylinder with the same keyway, but with no auxiliary locking mechanism, as both the first and second security level locks will have the same primary locking mechanism-such as tumbler pins.

A second level key will include a short blocking rib that is short with respect to the length of the key and will not contact the auxiliary locking mechanism in a first security level cylinder and is thus unable to move the auxiliary locking mechanism to an unlocked position. Thus, while the second level key can be inserted into the keyway of a first security level lock, the second level key with the short blocking rib will only operate a second security level cylinder lock without the auxiliary locking mechanism. If the second level key is inserted into the keyway of a first security level lock, the blocking rib of the second level key will block access to the auxiliary locking mechanism and thus prevent the use of a picking tool to manipulate the auxiliary locking mechanism with a second level key inserted into the first security level lock.

The locks, keys, and hierarchical lock systems described herein allow for enhanced security levels without the need to modify any of the conventional pinning with top and bottom pins. Different key bitting tools or repining tools are not required for the locks described herein.

To avoid the burden of constantly developing new keyway shapes/designs that do not allow interchange between keys in the same or similar products and to address the thousands of existing key profiles developed by other lock manufacturers, the approach described herein will allow the reuse of existing keyway profiles for the primary keyway but will not allow preexisting keys to operate in the first security level lock described herein. The primary keyway can be the same as existing keyways and lock cylinders in a particular lock family, but the addition of the recessed control groove (and an auxiliary locking pin and slider) in the first security level lock and the required control rib on the side of the associated first level key will prevent preexisting keys from being used in the first security level lock. Existing key families from current lock systems can be used for the primary keyway of the first security level locks described herein by adding a control rib in first level key to operate the first security level cylinder and by adding a control groove of a secondary keyway to the lock cylinder.

Additionally, the first level keys described herein with the added control rib and second level keys described herein with blocking ribs will not be able to be inserted into the preexisting keyways even though the primary keyway is the same. This allows the utilization of existing keyways without having to redesign the keyway and pinning and check for interchange with other systems or competitor keys.

Implementations of the disclosure can be described in view of the following embodiments, the features of which can be combined in any reasonable manner.

Some Embodiments Encompass

Embodiment A1—A key blade configured to operate a lock, wherein the lock includes cylindrical plug having an axially-extending keyway and wherein the keyway has a top edge, a bottom edge that is open along an outer surface of the cylindrical plug, and a control groove extending from a side of the keyway and located above the bottom edge of the keyway, a plurality of tumbler pins disposed within tumbler pin holes formed in the cylindrical plug extending radially from the keyway, wherein the plurality of tumbler pins are adapted to control rotation of the cylindrical plug, and an auxiliary locking mechanism including a slider disposed within the cylindrical plug and moveable in an axial direction between a first position in which the auxiliary locking mechanism blocks rotation of the cylindrical plug and a second position in which the auxiliary locking mechanism permits rotation of the cylindrical plug, and wherein the slider includes a control surface disposed within the control groove; wherein the key blade has a top edge, a bottom edge, a first side, and an opposed second side defining a cross sectional shape of the key blade, wherein the cross sectional shape of the key blade is divided into four blade segments between the top and bottom edges for a portion of a length of the key blade, and wherein the four blade segments comprise: (i) a first blade segment defined by the top edge of the key blade, a lower boundary extending from the first side to the second side of the key blade and located between the top edge and the bottom edge of the key blade, a first side boundary contacting an outermost portion of the first side of the key blade between the top edge and the lower boundary of the first blade segment, and a second side boundary contacting an outermost portion of the second side of the key blade between the top edge and the lower boundary of the first blade segment, wherein the first blade segment has a first width from the first side boundary to the second side boundary of the first blade segment and includes bittings formed along the top edge for positioning the plurality of tumbler pins to permit the cylindrical plug to rotate; (ii) a second blade segment defined by an upper boundary coinciding with the lower boundary of the first blade segment, a lower boundary extending from the first side to the second side of the key blade and located between the upper boundary of the second blade segment and the bottom edge of the key blade, a first side boundary contacting an outermost portion of the first side of the key blade between the upper boundary and the lower boundary of the second blade segment, and a second side boundary contacting an outermost portion of the second side of the key blade between the upper boundary of the second blade segment and the lower boundary of the second blade segment, wherein the second blade segment has a second width from the first side boundary to the second side boundary of the second blade segment, wherein the second width is greater than the first width, and wherein the second blade segment includes at least one of grooves and ridges extending along at least one of the first side and the second side and conforming to mating grooves and/or ridges formed along a side of the keyway; (iii) a third blade segment defined by an upper boundary coinciding with the lower boundary of the second blade segment, a lower boundary extending from the first side and the second side of the key blade and located between the upper boundary of the third blade segment and the bottom edge of the key blade, a first side boundary contacting an outermost portion of the first side of the key blade between the upper boundary and the lower boundary of the third blade segment, and a second side boundary contacting an outermost portion of the second side of the key blade between the upper boundary and the lower boundary of the third blade segment, wherein the third blade segment has a third width from the first side boundary to the second side boundary of the third blade segment, and wherein the third width is greater than the second width, and wherein the third blade segment includes a control rib that extends into the control groove of the keyway to contact the control surface of the slider to move the slider from the first position to the second position when the key blade is fully inserted into the keyway; and (iv) a fourth blade segment defined by an upper boundary coinciding with the lower boundary of the third blade segment, the bottom edge of the key blade, a first side boundary contacting an outermost portion of the first side of the key blade between the upper boundary of the fourth blade segment and the bottom edge, and a second side boundary contacting an outermost portion of the second side surface of the key blade between the upper boundary of the fourth blade segment and the bottom edge, wherein the fourth blade segment has a fourth width from the first side boundary to the second side boundary of the fourth blade segment, and wherein the fourth width is less than the third width.

Embodiment A2—The key blade of embodiment A1, wherein the first side boundary of the second blade segment is coplanar with the first side boundary of the first blade segment, the first side boundary of the third blade segment is coplanar with the first side boundary of the second blade segment, and the first side boundary of the fourth blade segment is coplanar with the first side boundary of the third blade segment.

Embodiment A3—The key blade of embodiment A1, further comprising a registry groove formed in the first side of the third blade segment, wherein the registry groove is a paracentric groove.

Embodiment A4—The key blade of embodiment A1, wherein the fourth width of the fourth blade segment is equal to the second width of the second blade segment.

Embodiment A5—The key blade of embodiment A1, wherein the first blade segment includes one or more grooves and/or ridges extending along a length of the blade along the first side and/or the second side of the blade to define a profile of the blade.

Embodiment A6—The key blade of embodiment A1, wherein the second blade segment includes one or more grooves and/or ridges extending along a length of the blade along the first side and/or the second side of the blade to define a profile of the blade.

Some Embodiments Encompass

Embodiment B1.—A key blank for cutting to form a key to operate a cylinder lock, the key blank having a bow connected to a key blade, wherein the key blade has a top edge for cutting key bits therein, a bottom edge, and opposite first and second sides for receiving grooves and ridges and which define a cross-sectional shape of the key blade, wherein the key blade is divided into four or more segments between the top edge and the bottom edge along a portion of a length of the key blade, and wherein the segments comprise: a first segment beginning at the top edge of the key blade and having a first width from an outermost part of the first side to an outermost part of the second side within the first segment, wherein the first segment is configured to receive key bitting for positioning a plurality of tumbler pins disposed within tumbler pin holes formed in a cylindrical plug of the cylinder lock; a second segment adjacent to the first segment and having a second width from an outermost part of the first side to an outermost part of the second side within the second segment, wherein the second segment contains ridges and grooves to conform to ridges and grooves of a profile of the keyway formed in the cylinder plug, and wherein the second width is greater than the first width; a third segment adjacent to the second segment and having, along a portion of a length of the key blade, a third width from an outermost part of the first side to an outermost part of the second side within the third segment, wherein the third segment includes a control rib that extends into a control groove formed in a side of the keyway to contact a control surface of a slider of an auxiliary locking mechanism of the cylinder lock to move the slider in an axial direction from a first position in which the auxiliary locking mechanism blocks rotation of the cylindrical plug to a second position in which the auxiliary locking mechanism permits rotation of the cylindrical plug, and wherein the third width is greater than the second width; and a fourth segment adjacent to the third segment, terminating at the bottom edge of the keyway, and having a fourth width from an outermost part of the first side to an outermost part of the second side within the fourth segment, wherein the fourth width is less than the third width.

Embodiment B2—The key blank of embodiment B1 wherein the outermost part of the first side is coplanar within the first, second, third and fourth segments.

Embodiment B3—The key blank of embodiment B1 or embodiment B2, wherein the fourth width of the fourth segment is equal to the second width of the second segment.

Embodiment B4—The key blank of any one of embodiments B1 to B3, wherein the third segment includes a registry groove on a side of the blade opposite the control rib, and wherein the registry groove is a paracentric groove.

Embodiment B5—The key blank of embodiment B1, wherein the first blade segment includes one or more grooves and/or ridges extending along a length of the blade along the first side and/or the second side of the blade to define a profile of the blade.

Embodiment B6—The key blank of embodiment B1, wherein the second blade segment includes one or more grooves and/or ridges extending along a length of the blade along the first side and/or the second side of the blade to define a profile of the blade.

Some Embodiments Encompass

Embodiment C1—A hierarchical lock system comprising: at least one first security level lock having a primary locking mechanism moveable between a locked position and an unlocked position and an auxiliary locking mechanism moveable between a locked position and an unlocked position, wherein each first security level lock is configured to be unlocked when the primary locking mechanism and the auxiliary locking mechanism of the first security level lock are moved to their respective unlocked positions; at least one second security level lock having the primary locking mechanism but not the auxiliary locking mechanism of each first security level lock, wherein the second security level lock is configured to be unlocked when the primary locking mechanism of the second security level lock is moved to its unlocked position, wherein each of the first security level lock has a keyway and the second security level lock has a keyway that is the same as the keyway of the first security level lock, and wherein the keyway of each of the first and second security level locks is defined by at least four keyway sections between a top edge of the keyway and a bottom edge of the keyway, the at least four keyway sections comprising: a first keyway section beginning at the top edge of the keyway and having a first width from an outermost part of a first side of the keyway to an outermost part of a second side of the keyway within the first keyway section; a second keyway section adjacent to the first keyway section, wherein the second keyway section has a second width from an outermost part of the first side of the keyway to an outermost part of a second side of the keyway within the second keyway section, wherein the second keyway section contains ridges and grooves to define a profile of the keyway, and wherein the second width is greater than the first width; a third keyway section adjacent to the second keyway section and having a third width from an outermost part of the first side of the keyway to an outermost part of a second side of the keyway within the third keyway section, wherein the third keyway section includes a control groove, and wherein the third width is greater than the second width; and a fourth keyway section adjacent to the third keyway section, terminating at the bottom edge of the keyway, and having a fourth width from an outermost part of the first side of the keyway to an outermost part of a second side of the keyway within the fourth keyway section, and wherein the fourth width of the fourth keyway section is less than the third width of the third keyway section; at least one first level key for operating each first security level lock and each second security level lock, wherein each first level key has a key blade having a top edge, a bottom edge, and opposite first and second sides, wherein the key blade is divided into at least four blade segments between the top edge and the bottom edge for at least a portion of a length of the key blade, and wherein the at least four segments comprise: a first blade segment beginning at the top edge of the key blade and having a first width from an outermost part of the first side to an outermost part of the second side within the first blade segment, wherein the first width of the first blade segment is not greater than the first width of the first keyway section, and wherein the first blade segment includes key bitting on the top edge for moving the primary locking mechanism of each first security level lock and each second security level lock from the locked position to the unlocked position; a second blade segment adjacent to the first blade segment and having a second width from an outermost part of the first side to an outermost part of the second side within the second blade segment, wherein the second blade segment contains ridges conforming to the grooves of the second keyway section and grooves conforming to the ridges of the second keyway section, wherein the second width of the second blade segment: (1) is greater than the first width of the first blade segment, (2) is not greater than the second width of the second keyway section, and (3) is greater than the first width of the first keyway section; a third blade segment adjacent to the second blade segment and having a third width from an outermost part of the first side to an outermost part of the second side within the third blade segment, wherein the third blade segment includes a control rib that is received within the control groove of the third keyway section of the keyway of each first security level lock and each second security level lock, wherein the control rib is configured to move the auxiliary locking mechanism of each first security level lock from the locked position to the unlocked position, wherein the third width of the third blade segment: (1) is greater than the second width of the second blade segment, (2) is not greater than the third width of the third keyway section, and (3) is greater than the second width of the second keyway section; and a fourth blade segment adjacent to the third blade segment, terminating at the bottom edge of the key blade, and having a fourth width from an outermost part of the first side to an outermost part of the second side within the fourth blade segment, wherein the fourth width of the fourth blade segment is less than the third width of the third blade segment; and at least one second level key for operating each second security level lock but not able to operate any first security level lock, wherein each second level key has a key blade having a top edge, a bottom edge, and opposite first and second sides, wherein the key blade is divided into at least two blade segments between the top edge and the bottom edge for at least a portion of a length of the key blade, and wherein the at least two segments comprise: a first blade segment beginning at the top edge of the key blade and having a first width from an outermost part of the first side to an outermost part of the second side within the first blade segment, wherein the first width of the first blade segment is not greater than the first width of the first keyway section, and wherein the first blade segment includes key bitting on the top edge for moving the primary locking mechanism of each second security level lock from the locked position to the unlocked position; and a second blade segment adjacent to the first blade segment and having a second width from an outermost part of the first side to an outermost part of the second side within the second blade segment, wherein the second blade segment contains ridges conforming to the grooves of the second keyway section and grooves conforming to the ridges of the second keyway section, wherein the second width of the second blade segment is greater than the first width of the first blade segment, wherein the second width of the second blade segment is not greater than the second width of the second keyway section, the third width of the third keyway section, and the fourth width of the fourth keyway section, and wherein the second width of the second blade segment is greater than the first width of the first keyway section; and wherein the second level key has a blocking rib positioned with respect to the key blade so as to block the control groove of the third keyway section when the blade of the second level key is inserted into the keyway Embodiment C2—The hierarchical lock system of embodiment C1, wherein the key bitting of the first blade segment of the second level key is the same as the key bitting of the first blade segment of the first level key.

Embodiment C3—The hierarchical lock system of embodiment C1, wherein third keyway section has a paracentric ridge and third blade segment of the first level key has a conforming paracentric groove.

Embodiment C4—The hierarchical lock system of embodiment C1, wherein each of the first security level lock and the second security level lock comprises a cylindrical plug within which the keyway is formed, wherein the primary locking mechanism of the first security level lock and the second security level lock comprises a plurality of tumbler pins disposed within tumbler pin holes formed in the cylindrical plug and aligned with the keyway, and wherein the key bitting of each first level key and each second level key is configured to manipulate the tumbler pins into open configurations that do not block the cylindrical plug from rotating when the first or second level key is inserted into the keyway.

Embodiment C5—The hierarchical lock system of embodiment C4, wherein the auxiliary locking mechanism comprises: an auxiliary locking pin disposed within the cylindrical plug at a laterally-offset position with respect to the keyway and moveable between a first position in which a portion of the auxiliary locking pin extends out of a hole formed in an outer wall of the cylindrical plug and a second position in which the auxiliary locking pin is retracted into the hole; and a slider disposed within a slider cavity formed the cylindrical plug and moveable in an axial direction between a first position and a second position, the slider being constructed and arranged to be engaged by the control rib of a first level key inserted into the keyway to move the slider from the first position to the second position, wherein the slider is operatively inter-engaged with the auxiliary locking pin such that the auxiliary locking pin is in its first position when the slider is in its first position and the locking pin moves from its first position to its second position when the slider is moved from its first position to its second position.

Embodiment C6—The hierarchical lock system of embodiment C1, wherein the fourth width of the fourth keyway section is equal to the second width of the second keyway section.

Embodiment C7—The hierarchical lock system of embodiment C1, wherein the outermost parts of the first sides of the first, second, third, and fourth keyway sections are coplanar.

Embodiment C8—The hierarchical lock system of embodiment C1, wherein the outermost parts of the first sides of the first, second, third, and fourth blade segments of the first level key are coplanar.

Embodiment C9—The hierarchical lock system of embodiment C1, wherein the outermost parts of the first sides of the first and second blade segments of the second level key are coplanar.

Embodiment C10—The hierarchical lock system of embodiment C1, wherein the fourth width of the fourth blade segment of the first level key is equal to the second width of the second blade segment of the first level key.

Embodiment C11—The hierarchical lock system of embodiment C5, wherein the slider includes at least one control surface that extends into, but not beyond, the control groove of the third keyway section of the keyway of each first security level lock, the control rib of a first level key inserted into the keyway contacts the at least one control surface of the slider to move the slider from the first position to the second position.

Embodiment C12—The hierarchical lock system of embodiment C5, wherein the at least one control surface of the slider comprises a first control surface and a second control surface, and wherein the at least one first level key comprises: a master first level key, wherein the control rib of the master first level key is configured to contact the first control surface of the slider when the master first level key is inserted into the keyway; and a limited first level key, wherein the control rib of the limited first level key is configured to contact the second control surface of the slider when the limited first level key is inserted into the keyway.

Some Embodiments Encompass

Embodiment D1—A method of providing a hierarchical lock system having a plurality of locks operated by different keys and providing different levels of security among the plurality of locks, wherein the locks have keyways with profiles for receiving keys with key blades having cross-section profiles complementary to the profiles of the keyways, wherein the method comprises: varying the cross-section of blades of the different keys according to the level of security of the locks each key is configured to open, wherein a first key configured to open a first lock has a blade with at least four segments from one edge of the blade to an opposite edge of the blade, the at least four segments comprising a first segment having a first width, a second segment having a second width that is greater than the first width, a third segment having a third width that is greater than the second width, and a fourth segment having a fourth width that is less than the third width, and wherein a second key configured to open a second lock having a lower level of security than the first lock has a blade with at least two segments from one edge of the blade to an opposite edge of the blade, the at least two segments comprising a first segment having a first width and a second segment having a second width that is greater than the first width, and wherein the first key is also configured to open the second lock but the second key is not configured to open the first lock.

Some Embodiments Encompass

Embodiment E1—A key blade with a first side and a second side and opposite edges extending between the first and second sides, wherein the blade comprises first, second, third, and fourth segments having first, second, third, and fourth widths, respectively, between the first side and the second side, wherein the first segment includes a key bitting section extending for at least a portion of the length of the blade and adapted to be engaged by a key bitting implement for cutting bitting cuts into the key bitting section; wherein the second segment includes a series of grooves and ridges formed on the first and/or the second side of the key blade and extending for at least a portion of the length of the blade for defining a unique blade profile and the second width is greater than the first width; wherein the third segment includes a control rib extending for at least a portion of the length of the blade and adapted to engage an auxiliary locking mechanism of a lock and the third width is greater than the second width, and wherein the fourth width that is less than the third width.

Embodiment E2—The key blade of embodiment E1, wherein the fourth width is equal to the second width.

Embodiment E3—The key blade of embodiment E1, wherein the first segment includes a series of grooves and ridges formed on the first and/or the second side of the key blade and extending for at least a portion of the length of the blade for further defining the unique blade profile.

Some Embodiments Encompass

Embodiment F1—A key blade with top edge and a bottom edge, wherein the blade is divided, progressing from the top edge to the bottom edge, into a first segment, a second segment, a third segment, and a fourth segment, and wherein: the first segment has a first width; the second segment is adjacent to the first segment, has a second width that is wider than the first width, and includes one or more grooves and/or ridges on a first and/or a second side of the second segment to define a profile of the blade; the third segment is adjacent to the second segment, has a third width that is wider than the second width, and includes a control rib on a second side of the third segment extending for at least a portion of a length of the blade, and the fourth segment is adjacent to the third segment and has a fourth width that is narrower than the third width.

Embodiment F2—The key blade of embodiment F1, wherein the third segment includes a registry groove on a first side of the third segment, wherein the registry groove is a paracentric groove that extends beyond a centerline of the second segment.

Embodiment F3—The key blade of embodiment F1, wherein the fourth width is equal to the second width.

Embodiment F4—The key blade of embodiment F1, wherein first sides of the first, second, third, and fourth segments are coplanar with each other.

Some Embodiments Encompass

Embodiment G1—A lock system comprising at least one first security level lock having a primary locking mechanism moveable between a locked position and an unlocked position and an auxiliary locking mechanism moveable between a locked position and an unlocked position, wherein each first security level lock is configured to be unlocked when the primary locking mechanism and the auxiliary locking mechanism of the first security level lock are moved to their respective unlocked positions, and wherein the first security level lock includes a cylindrical plug having a primary keyway and a secondary keyway, wherein the primary locking mechanism extends into the primary keyway to be engaged by a primary blade element of a key blade inserted into the primary keyway to manipulate the primary locking mechanism from its locked position to its unlocked position, and wherein the secondary locking mechanism extends into the secondary keyway but not the primary keyway to be engaged by a portion of a secondary blade element of the key blade that extends into the secondary keyway to manipulate the secondary locking mechanism from its locked position to its unlocked position.

Embodiment G2—The lock system of embodiment G1, further comprising at least one second security level lock having the primary locking mechanism but not the auxiliary locking mechanism of each first security level lock, wherein the second security level lock is configured to be unlocked when the primary locking mechanism of the second security level lock is moved to its unlocked position, wherein the second security level lock includes a cylindrical plug having the primary keyway to receive the primary blade element and the secondary keyway to receive the secondary blade element.

Embodiment G3—The lock system of embodiment G1, wherein the primary locking mechanism comprises a plurality of tumbler pins disposed within tumbler pin holes formed in the plug and aligned with the primary keyway.

Embodiment G4—The lock system of embodiment G3, wherein the auxiliary locking mechanism comprises: an auxiliary locking pin disposed within the cylindrical plug at a laterally-offset position with respect to the keyway and moveable between a first position in which a portion of the auxiliary locking pin extends out of a hole formed in an outer wall of the cylindrical plug and a second position in which the auxiliary locking pin is retracted into the hole; and a slider disposed within a slider cavity formed in the cylindrical plug and moveable in an axial direction between a first position and a second position, the slider including a control surface extending into the secondary keyway but not the primary keyway to be engaged by a control rib of the key blade.

Embodiment G5—The lock system of embodiment G2, further comprising: a first level key including the primary blade element and the secondary blade element, wherein the secondary blade element of the first level key comprises a control rib configured to be inserted into the secondary keyway of the first security level lock to manipulate the secondary locking mechanism from its locked position to its unlocked position when the key blade of the first level key is inserted into the keyway of the first security level lock, and wherein control rib is configured to be inserted into the secondary keyway of the second security level lock when the key blade of the first level key is inserted into the keyway of the second security level lock; and a second level key including the primary blade element and the secondary blade element, wherein the secondary blade element of the second level key comprises a blocking rib configured to be inserted into the secondary keyway of the first security level lock without manipulate the secondary locking mechanism from its locked position to its unlocked position when the key blade of the second level key is inserted into the keyway of the first security level lock, and wherein blocking rib is configured to be inserted into the secondary keyway of the second security level lock when the key blade of the second level key is inserted into the keyway of the second security level lock.

Other features and characteristics of the subject matter 1233-609 of this disclosure, as well as the methods of operation, functions of related elements of structure and the combination of parts, and economies of manufacture, will become more apparent upon consideration of the following description and the appended claims with reference to the accompanying drawings, all of which form a part of this specification.

BRIEF DESCRIPTION OF THE DRAWINGS

The accompanying drawings, which are incorporated herein and form part of the specification, illustrate various examples and aspects of the subject matter of this disclosure. In the drawings, unless otherwise noted, like reference numbers indicate identical or functionally similar elements.

DETAILED DESCRIPTION

Figure 1:
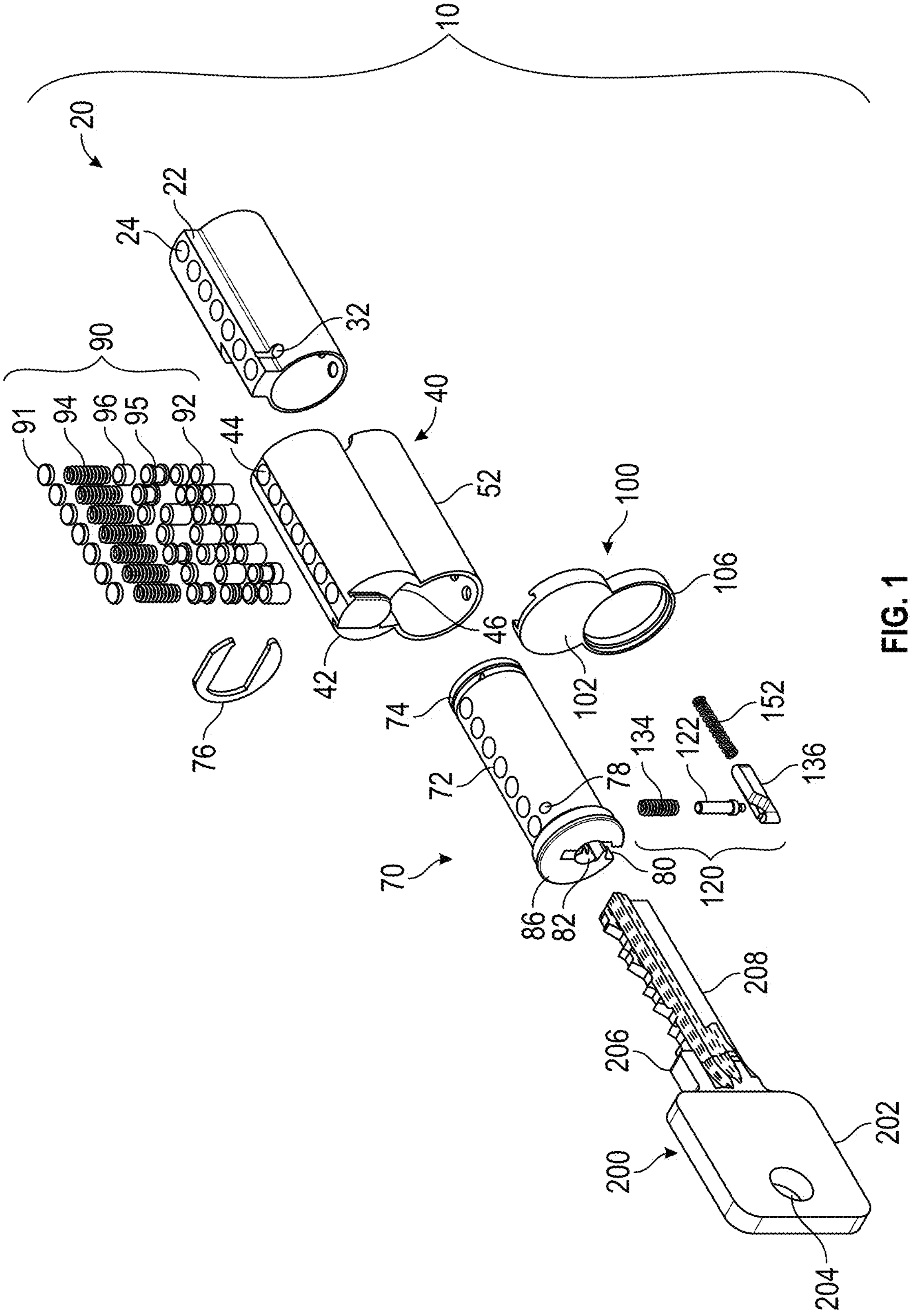
FIG. 1 is an exploded perspective view of a first security level cylinder lock with an auxiliary locking mechanism according to one embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples described and illustrated.

Definitions

Unless defined otherwise, all terms of art, notations and other technical terms or terminology used herein have the same meaning as is commonly understood by one of ordinary skill in the art to which this disclosure belongs. All patents, applications (whether or not published), published applications, and other documents and publications referred to herein are incorporated by reference in their entirety. If a definition set forth in this description is contrary to or otherwise inconsistent with a definition set forth in the patents, applications, published applications, and other documents and publications that are herein incorporated by reference, the definition set forth in this description prevails over the definition that is incorporated herein by reference.

Unless otherwise indicated or the context suggests otherwise, as used herein, "a" or "an" means "at least one" or "one or more" and may encompass the singular or the plural.

References in the specification to "one embodiment," "an embodiment," a "further embodiment," "an example," "an exemplary embodiment," "some aspects," "a further aspect," "aspects," and like terms, indicate that the embodiment, example, or aspect described may include a particular feature, structure, or characteristic, but every embodiment encompassed by this disclosure may not necessarily include the particular feature, structure, or characteristic or combination thereof. Moreover, such phrases are not necessarily referring to the same embodiment, example, or aspect. Further, when a particular feature, structure, or characteristic is described in connection with an embodiment, such feature, structure, or characteristic is also a description in connection with other embodiments, examples, or aspects with which it is not incompatible, whether or not explicitly described.

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, forward, backward, sideward, sideways, etc., are used for convenience in referring to such component, apparatus, location, feature, or a portion thereof or movement, force, or other dynamic action represented in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship, in which the first component, structure, or portion thereof is in direct contact with the second component, structure, or portion thereof, or an indirect relationship, in which there are one or more intervening components, structures, or portions thereof between the first component, structure, or portion thereof and the second component, structure, or portion thereof.

Unless otherwise stated, any specific dimensions mentioned in this description are merely representative of an exemplary implementation of a device embodying aspects of the disclosure and are not intended to be limiting.

To the extent used herein, the terms "about," "approximately," or similar terms apply to all numeric values and terms indicating specific physical orientations or relationships specified herein, such as, horizontal, vertical, parallel, perpendicular, concentric, or similar terms, whether or not explicitly indicated. Such terms generally refer to a range of numbers, orientations, and relationships that one of ordinary skill in the art would consider as a reasonable amount of deviation to the recited numeric values, orientations, and relationships (i.e., having the equivalent function or result) in the context of the present disclosure. For example, and not intended to be limiting, this term can be construed as including a deviation of +10 percent of the given numeric value, orientation, or relationship, provided such a deviation does not alter the end function or result of the stated value, orientation, or relationship. Therefore, for example, under some circumstances as would be appreciated by one of ordinary skill in the art, a value of about or approximately 1% can be construed to encompass a range from 0.9% to 1.1%.

To the extent used herein, the term "adjacent" refers to being near (spatial proximity) or adjoining (physical contact). Adjacent objects or portions thereof can be spaced apart from one another or can be in actual or direct physical contact with one another. In some instances, adjacent objects or portions thereof can be coupled to one another or can be formed integrally with one another. The term "adjacent" may refer to relative spatial proximity, i.e., adjacent objects may be closer to each other than to any other object(s).

To the extent used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as stated as well as instances in which the event, circumstance, characteristic, or property occurs to a close approximation, such as accounting for typical tolerance levels or variability of the examples described herein.

To the extent used herein, the terms "optional" and "optionally" or the term "may" (e.g., as in the phrase "may include," "may comprise," "may produce," "may provide," or similar phrases) mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not included or does not occur.

To the extent used herein, the terms "first," "second," and similar terms preceding the name of an element (e.g., a component, apparatus, location, feature, or a portion thereof or a direction of movement, force, or other dynamic action) are used for identification purposes to distinguish between similar elements, and are not intended to necessarily imply order, nor are the terms "first" and "second" intended to preclude the inclusion of additional similar elements. Furthermore, use of the term "first" preceding the name of an element (e.g., a component, apparatus, location, feature, or a portion thereof or a direction of movement, force, or other dynamic action) does not necessarily imply or require that there be additional, e.g., "second," "third," etc., such element(s).

To the extent used herein, the terms or phrases "configured to," "adapted to," "operable to," "constructed and arranged to," and similar terms mean that the object of the term or phrase includes, constitutes, or otherwise encompasses the requisite structure(s), mechanism(s), arrangement (s), component(s), material(s), algorithm(s), circuit(s), programming, etc. to perform a specified function, task, or tasks or achieve a specified output or characteristic, either automatically or perpetually or selectively when called upon to do so.

Description of Embodiments

A hierarchical lock system in accordance with this disclosure includes at least one first security level lock and at least one second security level lock. The first security level lock has a higher degree of security than the second security level lock. Specifically, the first security level lock has both a primary locking mechanism that is moveable between a locked position, or configuration, and an unlocked position, or configuration, and an auxiliary locking mechanism that is moveable between a locked position, or configuration, and an unlocked position, or configuration, both of which must be manipulated (e.g., by a properly configured key) from their locked positions to their unlocked positions or configurations for the first security level lock to open. The second security level lock has the primary locking mechanism, which may be the same primary locking mechanism of the first security level lock, but not the auxiliary locking mechanism Thus, the second security level lock is configured to be unlocked when the primary locking mechanism of the second security level lock is manipulated (e.g., by a properly configured key) from its locked position to its unlocked position. As will be described herein, each of the first security level lock and the second security level lock has the same keyway defined by at least four keyway sections between a top edge of the keyway and a bottom edge of the keyway.

Keys for the hierarchical lock system include at least a first level key (or first level key blank for making a first level key) and a second level key (or second level key blank for making a second level key). The first level key is configured to open either a first security level lock—by manipulating both the primary and auxiliary locking mechanisms of the first security level lock to their open (unlocked) positions or configurations—or a second security level lock—by manipulating only the primary locking mechanism of the second security level lock to its open (unlocked) position or configuration. The second level key is configured to open a second security level lock—by manipulating the primary locking mechanism of the second security level lock to its open (unlocked) position or configuration—but is unable to manipulate the auxiliary locking mechanism of the first security level lock to its open (unlocked) position or configuration and therefore is unable to open a first security level lock.

FIG. 1 is an exploded perspective view of a first security level cylinder lock 10 according to one example of the disclosure. First security level lock 10 may include a cylindrical plug 70, a control sleeve 20, a shell 40, a faceplate 100, a primary locking mechanism 90, and an auxiliary, or secondary, locking mechanism 120. The cylinder lock 10 shown in FIG. 1 is of the type known as a small format interchangeable core cylinder. This is for the sole purpose of illustrating an example of the inventive lock incorporating an auxiliary locking mechanism and is not intended to be limiting, as the auxiliary locking mechanism could be incorporated into other locks as well.

The shell 40 may include an upper section 42 and a lower section 52. Lower section 52 has a hollow, generally cylindrical configuration. The upper section 42 has a solid, generally cylindrical configuration and includes tumbler holes 44 which receive tumbler pin assemblies 90 (i.e., pin stacks), which together form the primary locking mechanism of the first security level lock 10. Upper section 42 includes a recess 46 extending along the axial length of the shell 40 along the bottom of the upper section 42. The lower section 52 of the shell 40 is hollow to receive the control sleeve 20 and the plug 70.

Control sleeve 20 is housed inside the lower section 52 of the shell 40. Control sleeve 20 has a hollow, cylindrical configuration with a raised portion 22. Tumbler holes 24 formed in the raised portion 22 of the control sleeve 20 are aligned with tumbler holes 44 formed in the shell 40 when the control sleeve 20 is inserted into the shell 40, such that tumbler pin assemblies 90 inside may move up and down to control rotation of the plug 70 in the conventional manner of a tumbler pin lock cylinder. Raised portion 22 of the control sleeve 20 is received within the recess 46 formed in the upper section 42 of the shell 40. The control sleeve 20 further includes an auxiliary locking pin hole 32.

Faceplate 100 includes a guard 102 and may optionally include a ring 106 which rests against the opening of the lower section 52 of the shell 40 and surrounds a head 86 of the plug 70.

Plug 70 is mounted for axial rotation within the control sleeve 20 disposed within the lower section 52 of the shell 40. Tumbler holes 72 formed in the plug 70 are aligned with tumbler holes 24 formed in the raised portion 22 of the control sleeve 20 and tumbler holes 44 formed in the upper section 42 of the shell 40 and communicate with a keyway 80 formed axially into the plug 70. Plug 70 further includes an auxiliary locking pin hole 78. Tumbler pin assemblies 90 disposed within the tumbler holes 72 operate along with a key in a conventional manner to permit or prevent rotation of the plug 70 by aligning a shear line in each of the tumbler pin assemblies 90 with a shear line between plug 70 and control sleeve 20. This rotating action may be used to release a latching mechanism (not shown) coupled to the plug 70.

A retainer groove 74 may optionally be provided in a rear end of the plug 70 to receive an optional retainer clip 76 for securing the plug 70 within the sleeve 20 and shell 40.

Tumbler pin assemblies 90 comprise pin stacks comprised of bottom pins 92, top pins 96, one or more master wafers 95 between the bottom pins 92 and top pins 96, springs 94, and retainer caps 91 and are positioned in the tumbler holes 72, 24, and 44. Bottom pins 92 may have conical tips and are manipulated (elevated) by edge bittings having straight cuts, or bottom pins 92 may have chiseled tips and are manipulated (elevated and rotated) by edge bittings having angled cuts. The illustrated example has seven tumbler pin assemblies 90, but a lock embodying the concepts described herein may have more or less than seven tumbler pin assemblies.

Each tumbler pin assembly includes at least spring 94, top pin 96, and bottom pin 92, but arrangements of tumbler pin assemblies including one or more master wafers 95 provide master keying capability and are well known in the lock art.

The head 86 of the plug 70 provides the entry to the keyway 80. The entry may have formed keyway guides 82 which extend across the face of the entry. These guides, formed by depressions extending to the keyway 80, may be useful in guiding a key (as described herein) into the keyway 80.

Figure 4:
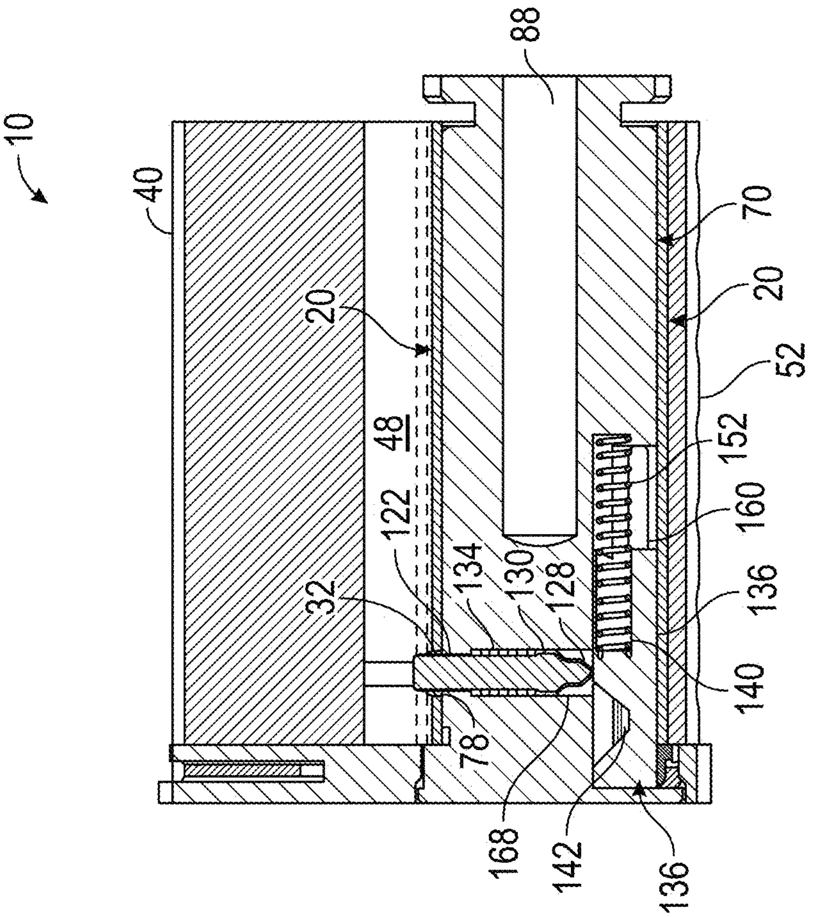
FIG. 4 is a side cross-sectional view of the first security level lock along line A-A in FIG. 3 without a key inserted into the keyway and with the auxiliary locking mechanism in the locked configuration.
Figure 3:
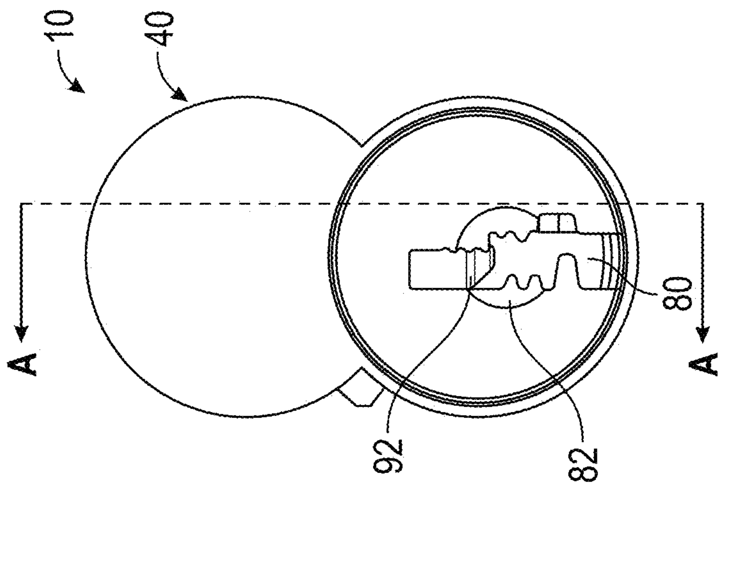
FIG. 3 is a front end view of the first security level cylinder lock without a key inserted into the keyway.
Figure 5:
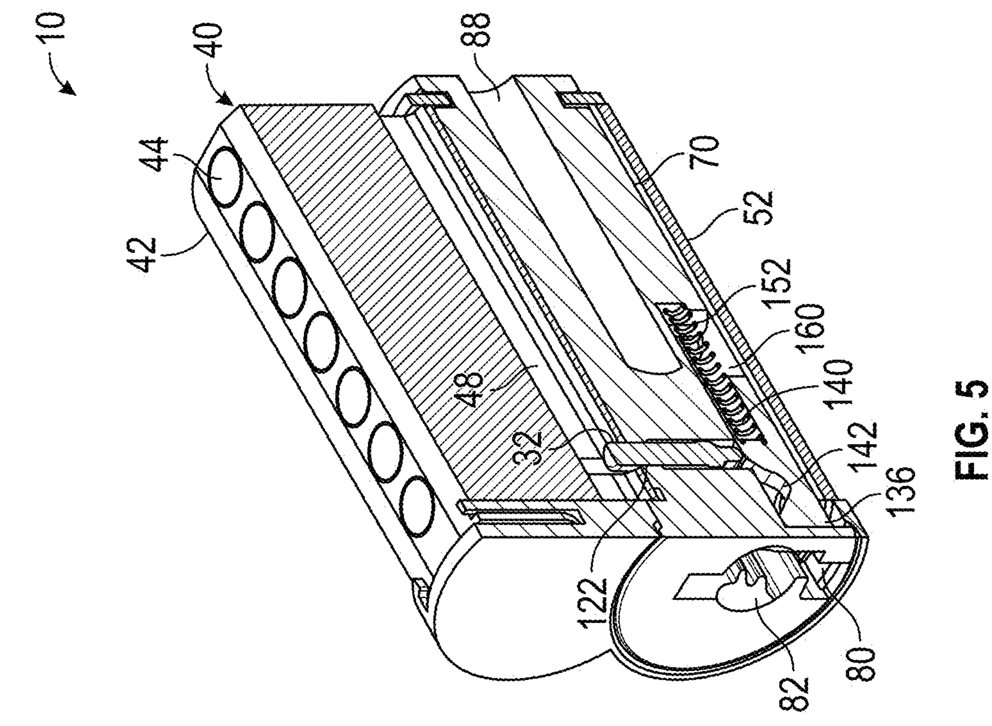
FIG. 5 is a perspective cross-sectional view of the first security level lock along line A-A in FIG. 3.

FIG. 3 is a front end view of the first security level lock 10, FIG. 4 is a side cross-section through the auxiliary locking pin 122 and slider 136 along line A-A in FIG. 3, and FIG. 5 is a perspective cross-section through the auxiliary locking pin 122 and slider 136 along line A-A in FIG. 3. As shown in FIGS. 4 and 5, cylindrical plug 70 may optionally include two longitudinally extending blind bores 88 (only one bore 88 is visible in each of FIGS. 4 and 5) oriented parallel to the keyway 80 and extending from a rear end of the cylindrical plug 70. One bore 88 may be formed on each side of the keyway 80, and the two bores 88 engage with corresponding prongs of a tailpiece (not shown), all of which are rotatably disposed in the cylinder shell 40, to operate the lock mechanism as the key turns.

An example of an auxiliary locking mechanism 120 includes auxiliary locking elements, such as, an auxiliary locking pin 122, a pin spring 134, a pin-actuating slider 136, and a slider spring 152. Further details of the auxiliary locking mechanism 120, the auxiliary locking elements, and specialized keys and key blanks for operating a first security level lock are described herein.

The auxiliary locking mechanism 120 is housed inside the plug 70. More specifically, as shown in FIGS. 4 and 5, the slider 136 and slider spring 152 are disposed within a slider cavity 160 formed in the plug 70, and the locking pin 122 and the pin spring 134 are disposed within a pin cavity 168 formed generally at a right angle to the slider cavity 160. The slider 136 is biased by spring 152 disposed between a back end of the slider 136 and a back end of the cavity 160 toward the forward end of the slider cavity 160 (i.e., toward the head 86 of the plug 70). The slider 136 and slider spring 152 are retained within the slider cavity 160 by the control sleeve 20 and the plug 70.

The auxiliary locking pin 122 includes an upper shaft, which is surrounded by the pin spring 134, and a lower point, or tip, 128 that is in contact with the slider 136. The auxiliary locking mechanism 120 effects auxiliary locking by the top end of the locking pin 122 extending through auxiliary pin locking holes 78 and 32 (formed in the plug 70 and the control sleeve 20, respectively) into a gap 48 defined within recess 46 adjacent the raised portion 22 (see FIGS. 4, 5, 10). The locking pin 122 resists rotation of the plug 70 by contacting the sides of hole 32. In particular, if a lock 10 were the tumblers were aligned with the shear line between the plug 70 and control sleeve 20 (e.g., by bumping the lock or inserting a second level key having edge bittings for elevating the tumbler pin assemblies), the auxiliary locking pin 122 ought to be able to resist rotation of the plug 70. A preferred material for the auxiliary locking pin 122 is stainless steel.

The top of the auxiliary locking pin 122 may optionally be sloped to conform with the peripheral curvature of cylindrical plug 70.

Figure 8:
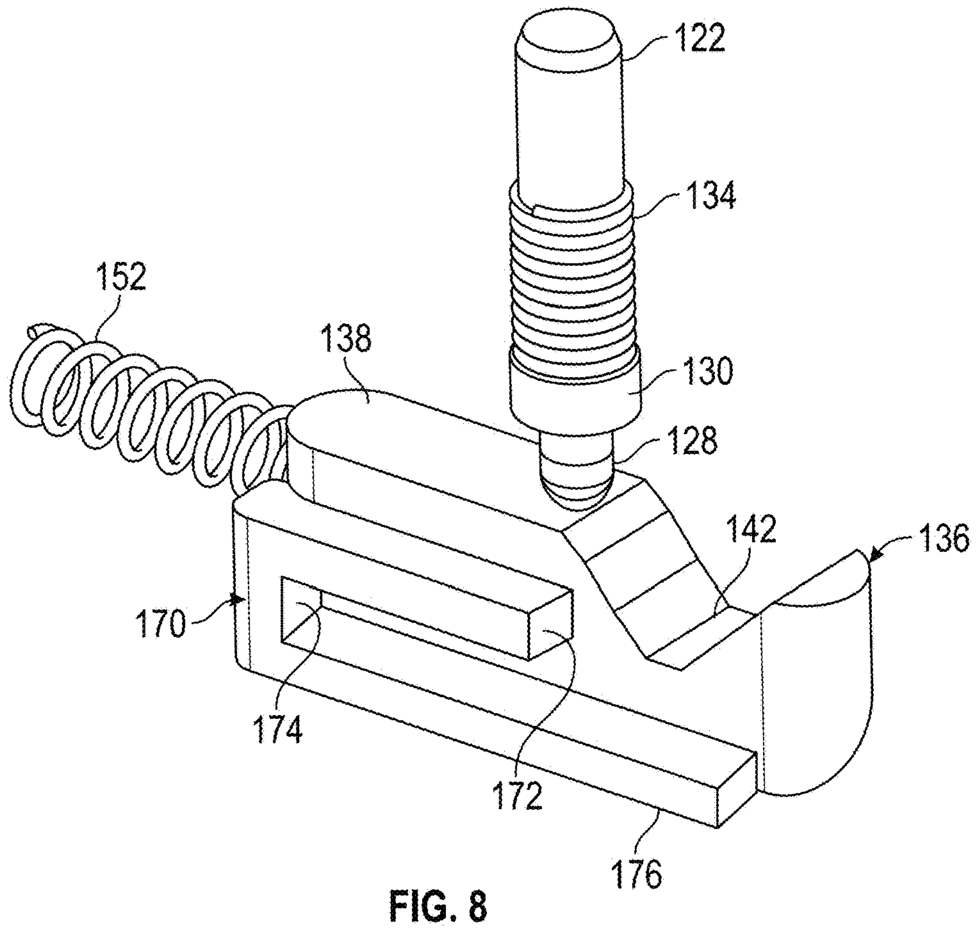
FIG. 8 is an isolated perspective view of a slider of an auxiliary locking mechanism of the first security level lock in the locked configuration with a tip of an auxiliary locking pin contacting a rear main body portion of the slider.

The auxiliary locking pin 122 may include a radial shoulder 130 (see FIGS. 4, 8) to provide a stop for the pin spring 134. The pin spring 134 is disposed around the locking pin 122 and extends between the shoulder 130 into a counterbore formed coaxially with pin hole 78 of the plug 70 to provide a downward biasing force upon the auxiliary locking pin 122.

The bottom tip 128 of the auxiliary locking pin 122 sits atop the slider 136.

The configuration of a second security level cylinder lock may be substantially similar to the configuration of first security level cylinder lock 10, but a second security level cylinder lock would lack an auxiliary locking mechanism 120 (i.e., the second security level lock would lack auxiliary locking pin 122, pin spring 134, pin-actuating slider 136, and slider spring 152). In addition, components of the second security level cylinder lock may lack features that are required to accommodate an auxiliary locking mechanism. Thus, for example, a plug of a second security level cylinder lock may lack a pin hole, such as pin hole 78 of plug 70 of first security level cylinder lock 10, a slider cavity, such as slider cavity 160 of plug 70 of first security level cylinder lock 10, and a control sleeve pin hole, such as auxiliary locking pin hole 32 of control sleeve 20 of first security level cylinder lock 10.

Second security level cylinder lock may include tumbler pin assemblies that are identical to tumbler pin assemblies 90 of first security level cylinder lock 10, including pin stacks comprised of bottom pins 92, top pins 96, one or more master wafers 95 between the bottom pins 92 and top pins 96, and springs 94 and are positioned in the aligned tumbler holes 72, 24, and 44. As described in more detail below, the plug of a second security level cylinder lock may have a keyway having a profile that is functionally identical to the profile of key 80 of plug 70 of first security level cylinder lock 10 so that a first level key of the hierarchical lock system that opens both the first security level cylinder lock and second security level cylinder lock can be inserted into the keyways of both locks.

Figure 10:
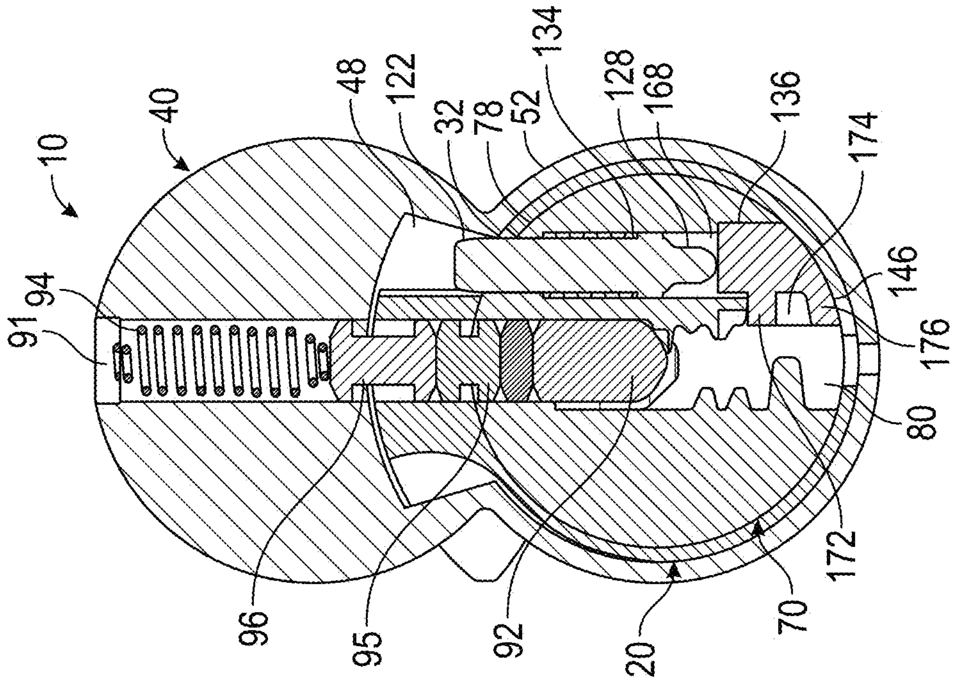
FIG. 10 is a transverse cross sectional view of the lock along line B-B in FIG. 9 without a key inserted into the keyway and with the primary locking mechanism and auxiliary locking mechanism in their locked configurations.
Figure 9:
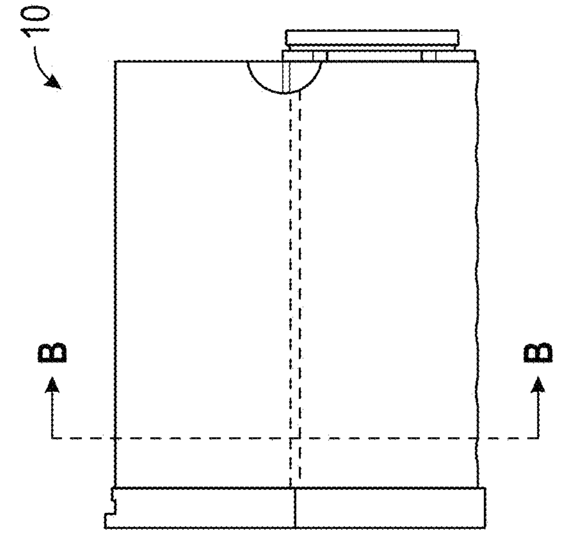
FIG. 9 is a side view of the first security level lock without a key inserted into the keyway.
Figure 28:
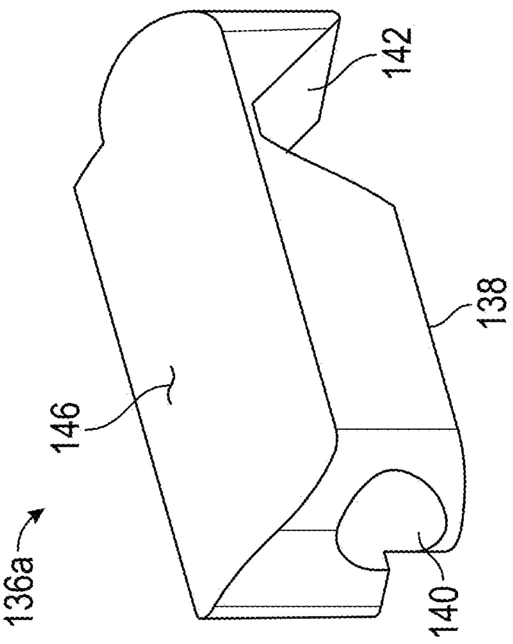
FIG. 28 is a second end bottom perspective view of the embodiment of FIGS. 19 and 20.

As shown in FIGS. 4 and 5, slider 136 of the first security level cylinder lock 10 includes a notch 142, a rear body portion 138, and a spring hole 140 formed in the rear body portion 138 in an axial orientation with respect to the plug 70. FIG. 9 is a side view of the first security level lock 10, and FIG. 10 is a transverse cross section of the lock 10 through the pin 122, slider 136, and one of tumbler pin assemblies 90 along line B-B in FIG. 9. As shown inf FIG. 10, a bottom surface portion 146 of the slider 136 (see also FIG. 28) conforms to the curvature of the plug 70, so the slider 136 is retained within the slider cavity 160 by the control sleeve 20.

As shown in FIGS. 4 and 5, the slider spring 152, having one end inserted into spring hole 140 formed in slider 136, urges the slider 136 toward a first position at the forward end of the slider cavity 160. With the slider 136 in this forward position, tip 128 of pin 122 contacts the top of the rear main body 138 of the slider 136. See also FIG. 8, which is an isolated perspective view of the slider 136 with the tip 128 of the auxiliary locking pin 122 contacting rear main body portion 138 of the slider 136 when the slider is in the first (locked) position. As shown in FIGS. 4, 5, and 10, with the auxiliary locking pin 122 supported on the rear main body portion 138 of the pin 136, the pin 122 is held up in a first position with the upper shaft of the pin 122 extending through the auxiliary pin locking holes 78 and 32 (formed in the plug 70 and the control sleeve 20, respectively) into the gap 48 to prevent rotation of the plug 70, and the slider prevents the pin 122, which is biased downwardly by the pin spring 134, from moving from this first position.

Figure 6:
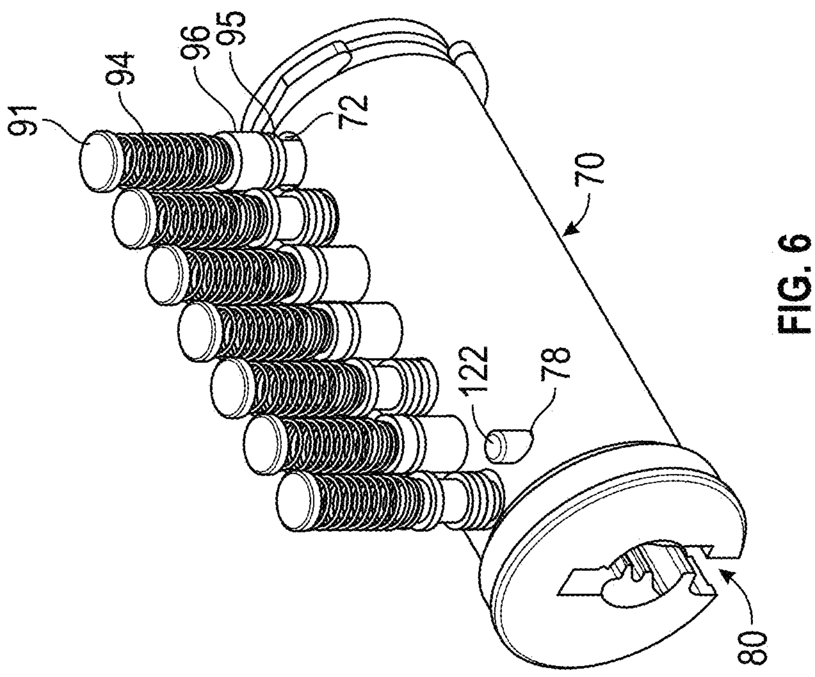
FIG. 6 is a perspective view of a plug of the first security level lock, tumbler pin assemblies in locked configurations, and an end of an auxiliary locking pin projecting from a pin hole in the plug.
Figure 7:
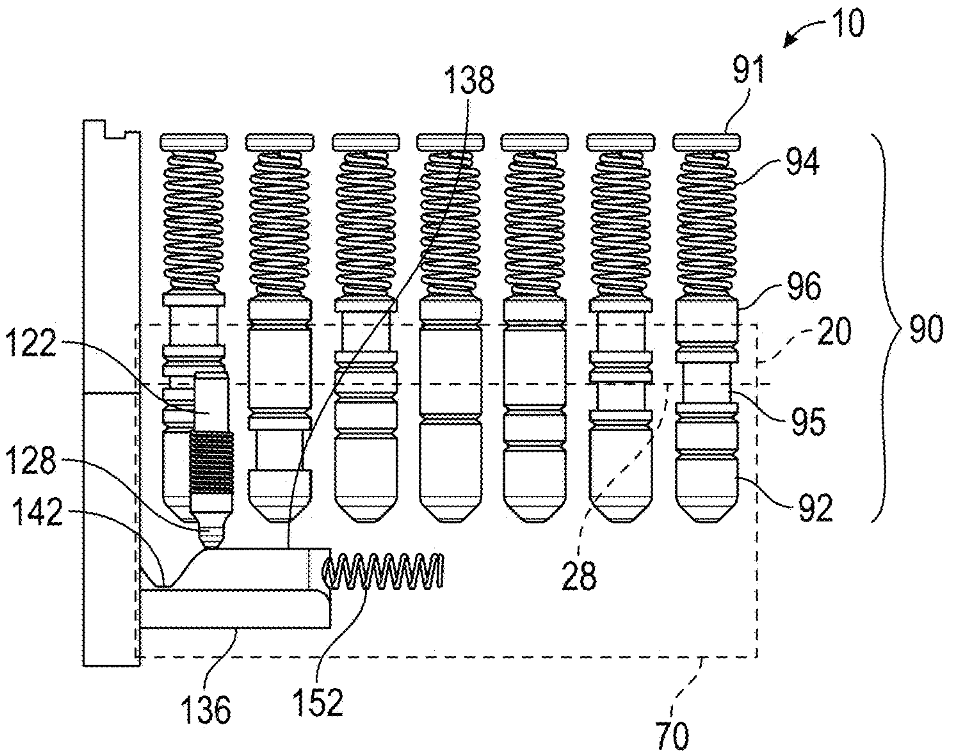
FIG. 7 is a side view of the first security level lock showing tumbler pin assemblies and the auxiliary locking mechanism in their locked configurations, showing the plug and control sleeve in phantom lines, and in which the shell is omitted from the drawing.

The slider 136 is in the first (locked) position when no key is inserted into the lock 10 At the same time, each of the tumbler pin assemblies 90 is in a locked position or configuration with a component, such as bottom pin 92, top pin 96, or one of the one or more master wafers 95, extending across a shear line between the plug 70 and the control sleeve 20. Pin assemblies 90 in their locked positions or configurations are illustrated in FIG. 6, which shows a top pin 96, bottom pin, 92, or one of the one or more master wafers 95 extending across an opening of a pin hole 72 of the plug 70. Pin assemblies 90 in their locked positions or configurations are illustrated in FIG. 7, in which one of the top pins 96 or master wafers 95 of each tumbler pin assembly 90 extends across a shear line 28 between the plug 70 and the control sleeve 20 (plug 70 and control sleeve 20 are shown in phantom lines and the shell 40 is omitted in FIG. 7). A pin assembly 90 in its locked position or configuration is illustrated in FIG. 10 in which one of a master wafers 95 of the tumbler pin assembly 90 extends across the shear line between the plug 70 and the control sleeve 20.

Figure 12:
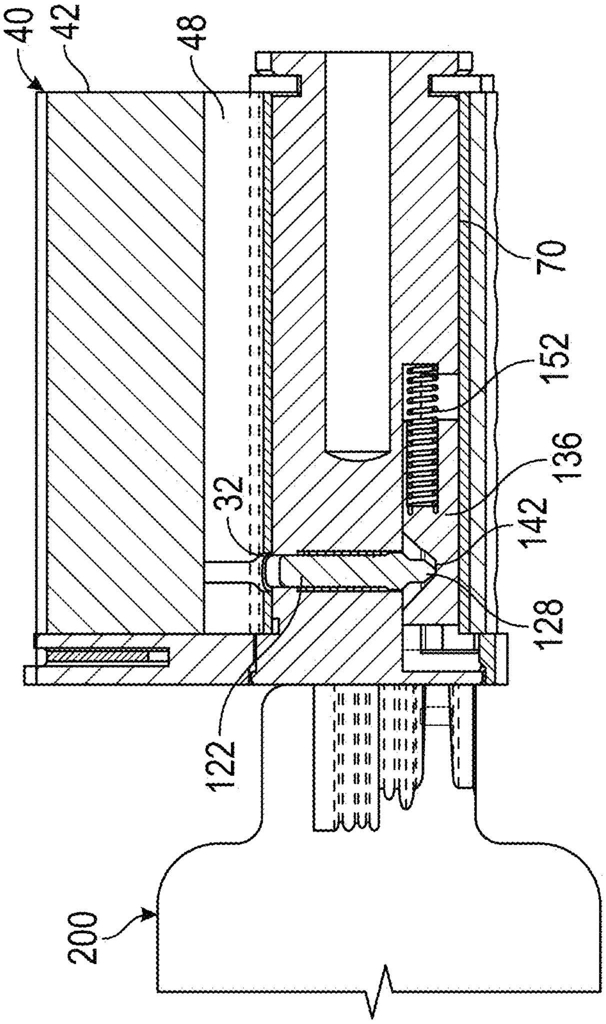
FIG. 12 is a side cross-sectional view of the first security level lock along line A-A in FIG. 11 with a key inserted into the keyway and with the auxiliary locking mechanism in the unlocked configuration.
Figure 11:
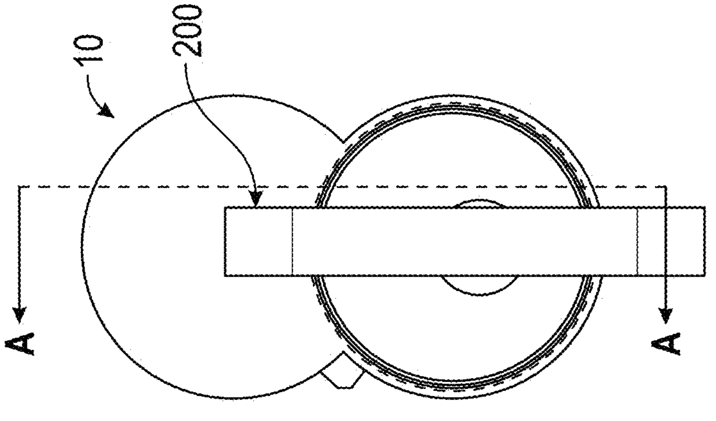
FIG. 11 is a front end view of the first security level cylinder lock with a key inserted into the keyway.
Figure 16:
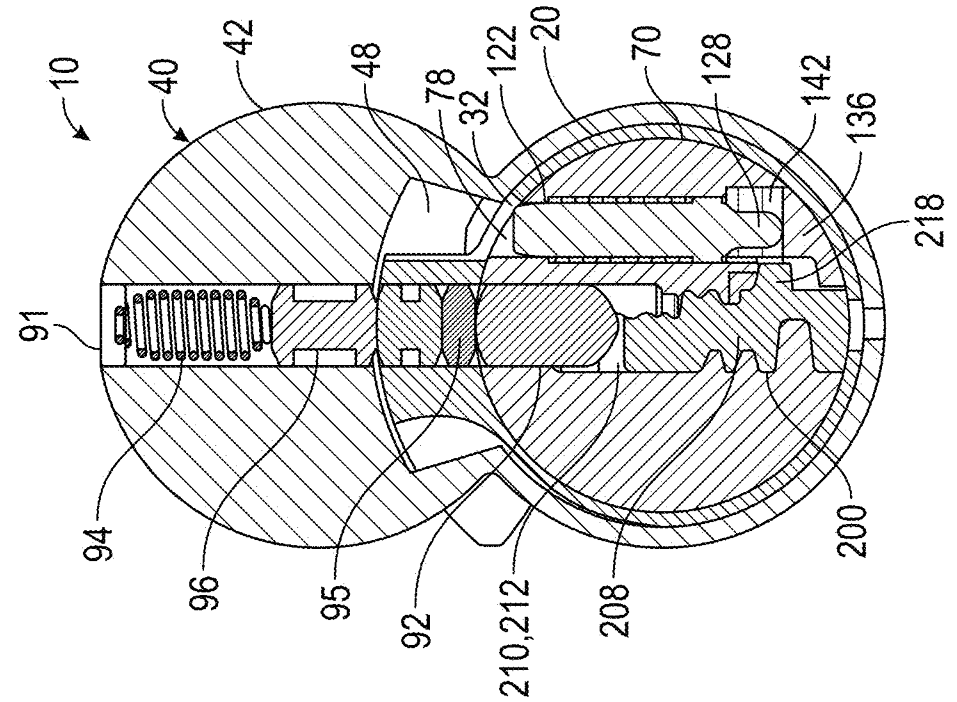
FIG. 16 is a transverse cross sectional view of the first security level lock along line B-B in FIG. 15 with a key inserted into the keyway and with the primary locking mechanism and auxiliary locking mechanism in their unlocked configurations.
Figure 15:
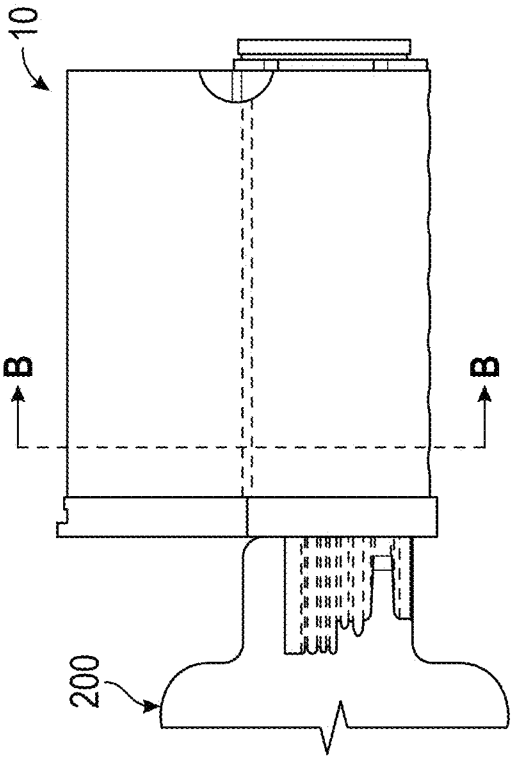
FIG. 15 is a side view of the first security level lock with a key inserted into the keyway.

When engaged by a properly bitted first level key 200 (as described in more detail below), the slider 136 is moved, against the bias of the slider spring 152, to a second position toward the back of the slider cavity 160. Meanwhile, the tip 128 of the auxiliary locking pin 122 slides along the top of the slider and into the notch 142, as shown in FIGS. 12, 13, 14, 16, thereby placing the auxiliary locking pin 122 in a second position. As shown in FIGS. 12 and 16, with the pin 122 moved into this second position, the upper shaft withdraws from the gap 48, through the auxiliary pin hole 32 formed in the control sleeve 20, so that the pin 122 no longer blocks the plug 70 from rotating within the control sleeve 20.

Figure 13:
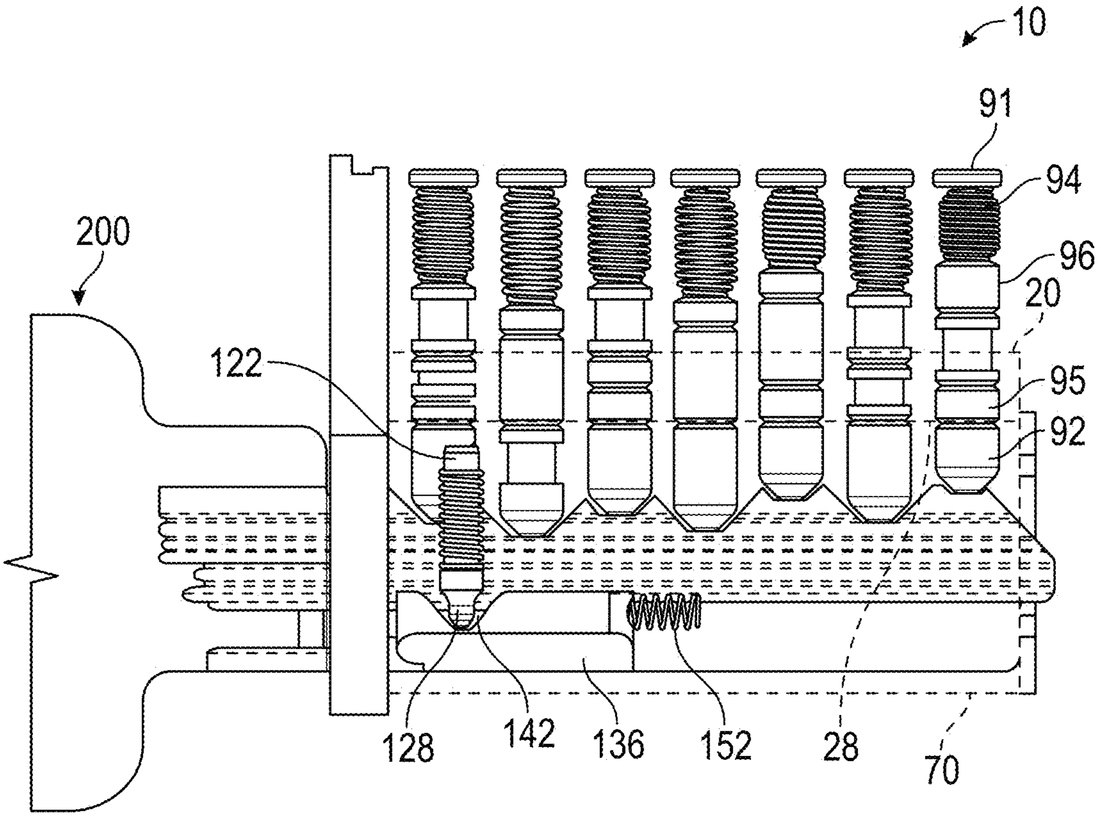
FIG. 13 is a side view of the first security level lock showing tumbler pin assemblies and the auxiliary locking mechanism in their unlocked configurations, showing the plug and control sleeve in phantom lines, and in which the shell is omitted from the drawing.
Figure 14:
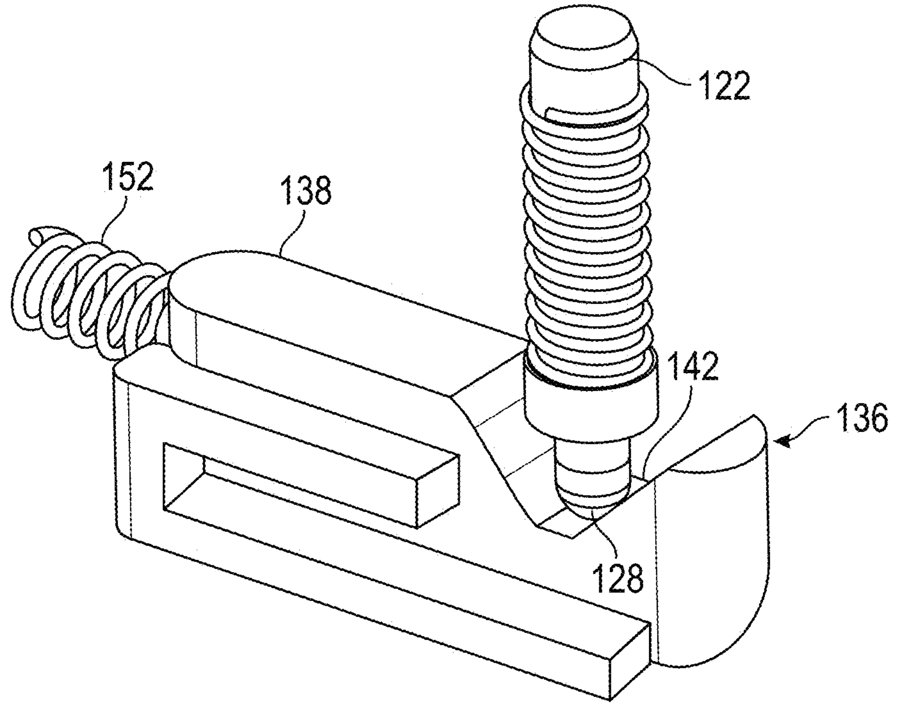
FIG. 14 is an isolated perspective view of the slider of the auxiliary locking mechanism of the first security level lock in the unlocked configuration with a tip of the auxiliary locking pin extending into a notch of the slider.

At the same time, a properly bitted first level key 200 has top edge bittings that elevate each of the tumbler pin assemblies 90 into an unlocked position or configuration with the shear line between the plug 70 and the control sleeve 20 aligned with an interface between the bottom pin 92 and one of the master wafers 95, between the top pin 96 and one of the master wafers 95, or between the top pin 96 and the bottom pin 92 (for a tumbler pin assembly having no master wafers). Pin assemblies 90 in their unlocked positions or configurations are illustrated in FIG. 13, in which the interface between one of the top pins 96 and a master wafers 95 or between the bottom pin 92 and one of the master wafers 95 is aligned with the shear line 28 between the plug 70 and the control sleeve 20 (plug 70 and control sleeve 20 are shown in phantom lines and the shell 40 is omitted in FIG. 13). A pin assembly 90 in its unlocked position or configuration is illustrated in FIG. 16 in which the interface between one of the master wafers 95 and the bottom pin 92 is aligned with the shear line between the plug 70 and the control sleeve 20.

Figure 18:
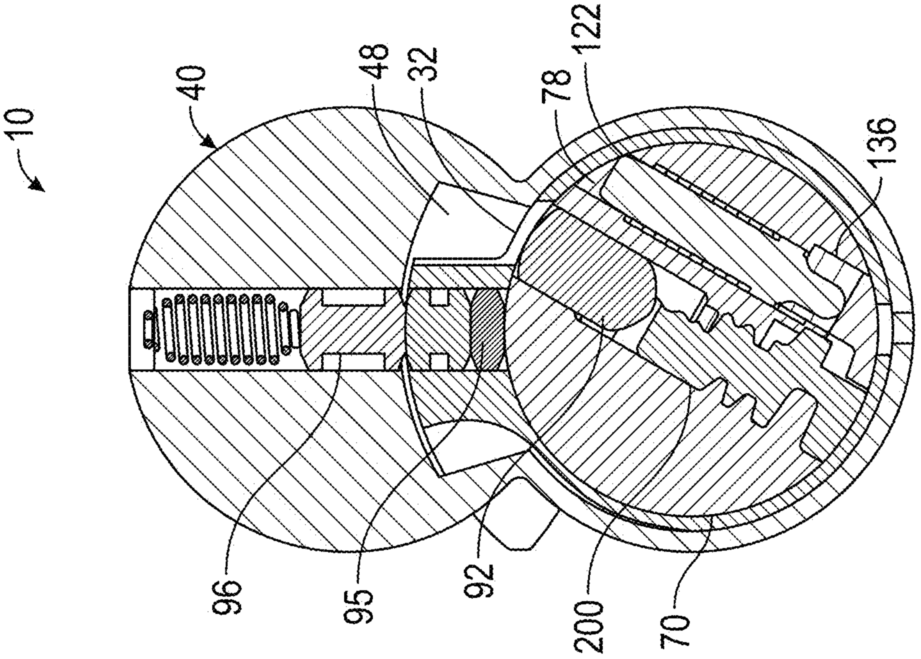
FIG. 18 is a transverse cross sectional view of the first security level lock along line B-B in FIG. 17 with a key inserted into the keyway and with the primary locking mechanism and auxiliary locking mechanism in their unlocked configurations and with the key and the plug of the lock partially rotated.
Figure 17:
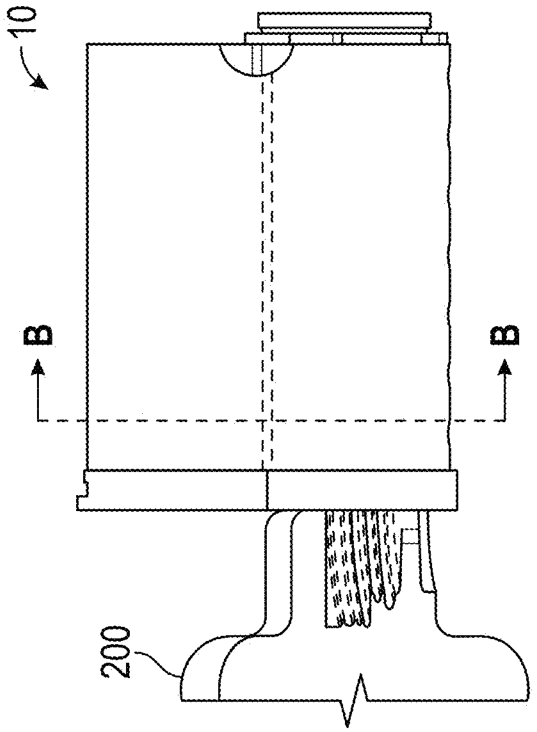
FIG. 17 is a side view of the first security level lock with a key inserted into the keyway and with the key partially rotated.

With the primary locking mechanism (tumbler pin assemblies 90) and the auxiliary locking mechanism (auxiliary locking pin 122) in their unlocked positions, the plug 70 can be rotated within the control sleeve 20 by applying torque to the key 200, as shown in FIGS. 17 and 18.

When plug 70 is returned to its unrotated position, and the key 200 is removed, the slider 136 is allowed to return under the force of spring 152 from the second position to the first position toward the front of the slider cavity 160. The tip 128 of the auxiliary locking pin 122 slides up along angled sides of the notch 142 to the top of the rear main body 138 of the slider 136. The upper shaft of the auxiliary locking pin 122 again protrudes through auxiliary locking pin hole 32 of the control sleeve into gap 48, and the plug 70 is again locked against rotation by the locking pin 122. Removal of the key will also allow the tumbler pin assemblies 90 to return to their locked positions.

Preferably, the angled side walls of the notch 142 form an angle of about 90°. If the angles of the side walls are too steep, then it will be difficult for the tip 128 of the auxiliary locking pin 122 to slide up the angled side wall and out of the notch 142 as the slider 136 moves from the back, second position to the forward, first position. On the other hand, if the angles of the side walls are too shallow, the linear distance required for the notch 142 to reach the necessary depth to permit the upper shaft 124 of the locking pin 122 to fully withdraw from the gap 48 will be too great, which will require an unnecessarily long slider.

A second security level lock of the hierarchical lock system will have a primary locking mechanism (tumbler pin assemblies 90) but no auxiliary locking mechanism (slider 136 and auxiliary locking pin 122). The tumbler pin assemblies 90 of the first security level lock 10 and the second security level lock may be commonly bitted so that both the first level key for operating both the first and second security level locks and the second level key for operating only the second security level lock will have the same edge bittings for elevating the tumbler pin assemblies 90 to their unlocked positions, or configurations. The first level key will have, in addition to edge bittings for elevating the tumbler pin assemblies 90, an auxiliary control surface (described below) for engaging the slider 136 of the auxiliary locking mechanism 120 to move the slider from its first (locked) position to its second (unlocked) position, but the second level key will lack the auxiliary control surface. Thus, if a second level key is inserted into the keyway 80 of the first security level lock 10, the tumbler pin assemblies 90 will be elevated to their unlocked positions, but the slider 136 will remain in its first position so that the auxiliary locking pin remains extend through auxiliary locking pin hole 32 of the control sleeve 20 into gap 48, and the plug 70 remains locked against rotation by the locking pin 122.

Figure 2:
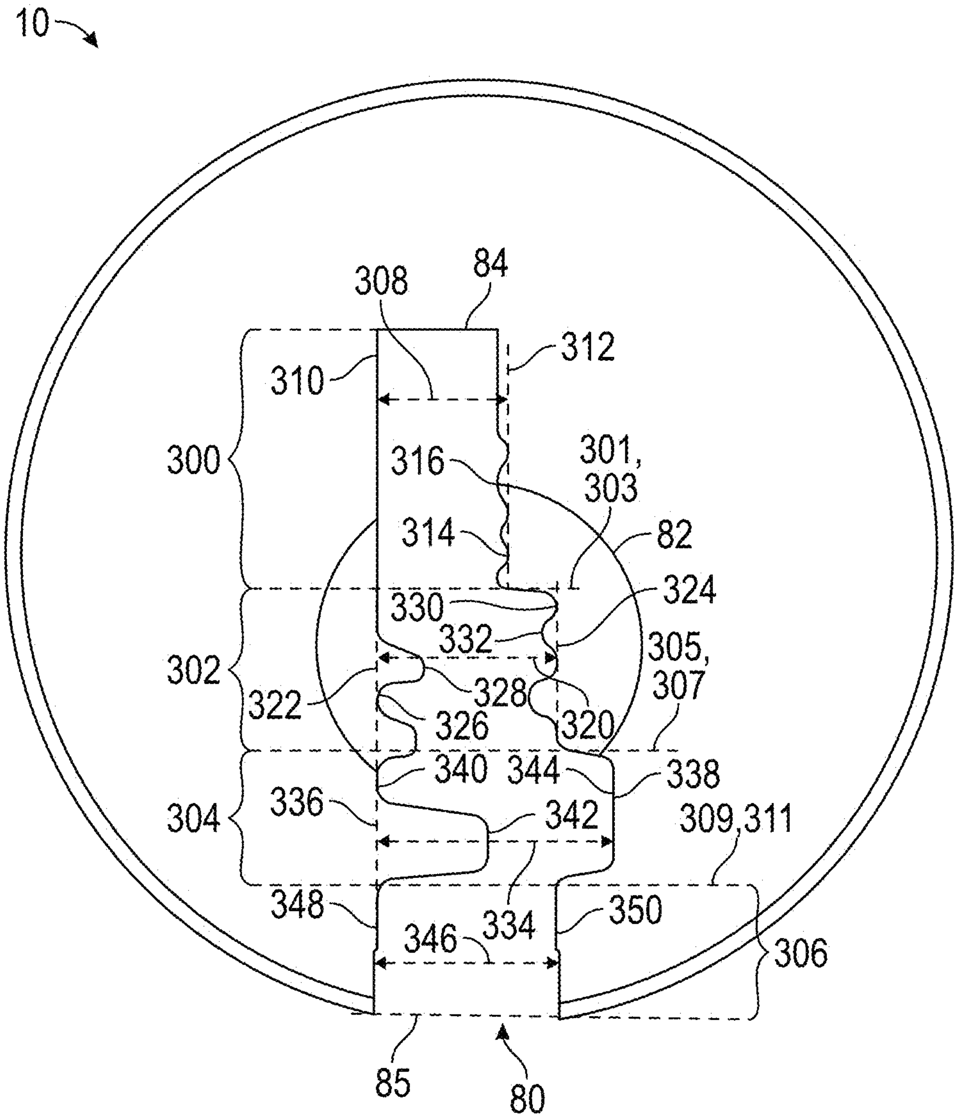
FIG. 2 is a front end view of a plug and faceplate of the first security level cylinder lock.

As noted herein, each of the first security level lock and the second security level lock have the same keyway which includes or defines a primary keyway and a secondary keyway as described below, which may be defined by at least four keyway sections between a top edge of the keyway and a bottom edge of the keyway. FIG. 2 shows a front end view of a plug and faceplate of the first security level cylinder lock 10, which is identical to the plug front end view of a plug and faceplate of a second security level lock. The four keyway sections of keyway 80 are a first keyway section 300, a second keyway section 302, a third keyway section 304, and a fourth keyway section 306.

First keyway section 300 extends between a top edge 84 of the keyway 80 and a lower boundary 301 and has a first width 308 from an outermost part of a first side (or first side boundary) 310 of the keyway 80 to an outermost part of a second side (or second side boundary) 312 of the keyway within the first keyway section 300. Lower boundary 301 does not necessarily correspond to any physical feature of the keyway 80 and may be an imaginary line dividing one distinct section of the keyway 80 from another distinct section of the keyway 80. First keyway section 300 may include one or more grooves 314 (which may have the same or different widths and depths) and one or more ridges 316 (which may have the same or different widths and depths), and the outermost part of the second side 312 is represented by a dashed line that is tangent to troughs of the grooves 314.

Second keyway section 302 is adjacent to—and may be contiguous with—the first keyway section 300 and extends between an upper boundary 303 that coincides with lower boundary 301 of first keyway section 300 and a lower boundary 305. Lower boundary 305 and upper boundary 303 do not necessarily correspond to any physical features of the keyway 80 and may be imaginary lines dividing one distinct section of the keyway 80 from another distinct section of the keyway 80. Second keyway section 302 has a second width 320 from an outermost part of a first side (or first side boundary) 322 of the keyway 80 to an outermost part of a second side (or second side boundary) 324 of the keyway 80 within the second keyway section 302. First side 322 of second keyway section 302 may be coplanar with first side 310 of first keyway section 300. Second width 320 of second keyway section 302 is greater than the first width 308 of first keyway section 300. Second keyway section 302 contains one or more ridges 328 and grooves 326 on the first side 322, and the outermost part of the first side 322 is represented by a dashed line that is tangent to the troughs of the grooves 326. Second keyway section 302 contains one or more ridges 332 and grooves 330 on the second side 324, and the outermost part of the second side 324 is represented by a dashed line that is tangent to the troughs of the grooves 330. Grooves 326, 330 and ridges 328, 332 define a profile of the keyway 80. In some embodiments, groove(s) 314 and ridge(s) 316 of first keyway section 300 may also define the profile of the keyway 80.

Third keyway section 304 is adjacent to—and may be contiguous with—second keyway section 302 and extends between an upper boundary 307 that coincides with lower boundary 305 of second keyway section 302 and a lower boundary 309. Lower boundary 309 and upper boundary 307 do not necessarily correspond to any physical features of the keyway 80 and may be imaginary lines dividing one distinct section of the keyway 80 from another distinct section of the keyway 80. Third keyway section 304 has a third width 334 from an outermost part of the first side (or first side boundary) 336 of the keyway 80 to an outermost part of a second side (or second side boundary) 338 of the keyway 80 within the third keyway section 304. First side 336 of third keyway section 304 may be coplanar with first side 322 of second keyway section 302. Third width 334 of third keyway section 304 is greater than the second width 320 of second keyway section 302. Third keyway section 304 includes a control groove 344, and the outermost part of the second side 338 corresponds to the trough of the control groove 344. Third keyway section 304 may also include a groove 340 on and a registry ridge 342 projecting from the first side 336, and the outermost part of the first side 336 is represented by a dashed line that is tangent to the trough of groove 340. Registry ridge 342 may be a paracentric ridge, meaning that it extends across at least half the second width 320 of the second keyway section 302.

Fourth keyway section 306 is adjacent to—and may be contiguous with—the third keyway section 304 and extends between an upper boundary 311 that coincides with lower boundary 309 of third keyway section 304 and a bottom end 85 of the keyway 80. Upper boundary 311 does not necessarily correspond to any physical feature of the keyway 80 and may be an imaginary line dividing one distinct section of the keyway 80 from another distinct section of the keyway 80. Fourth keyway section has a fourth width 346 from an outermost part of the first side (or first side boundary) 348 of the fourth keyway section 306 to an outermost part of a second side (or second side boundary) 350 of the keyway within the fourth keyway section 306. First side 348 of fourth keyway section 306 may be coplanar with first side 336 of third keyway section 304. Fourth width 346 is less than third width 334—and thus control groove 344 is elevated above the bottom of the profile of the keyway 80, and fourth width 346 may be equal to the second width 320.

The hierarchical lock system may include at least one first level key for operating each first security level lock and each second security level lock and at least one second level key for operating only each second security level lock of the system. In an alternate arraignment, the hierarchical lock system may include at least one master first level key for operating each first security level lock and each second security level lock, at least one limited first level key for operating some, but not all, first security level locks of the lock system and each second security level lock of the lock system, and at least one second level key for operating only each second security level lock of the system.

Each first and second level key may include a handle and a key blade extending from the handle and having first and second sides and first and second edges. Bittings are formed on the first (e.g., top) edge of each first and second level key blade for elevating the primary locking mechanism (tumbler pin assemblies 90) of the first and second security level locks.

As described herein, each first level key also includes a slider control rib (or control rib) projecting from the key blade. The control rib defines a control surface that engages a mating control surface of the slider when the key blade is inserted into the keyway 80 to move the slider from the first (locked) position to the second (unlocked position). The control surface of the slider extends from the slider 136 of the auxiliary locking mechanism 120 into, but not beyond, the control groove 344 of the third keyway section 304 of the keyway 80, and the slider control rib of a first level key inserted into keyway 80 extends in to the control groove 344 to engage the control surface of the slider.

Figure 29:
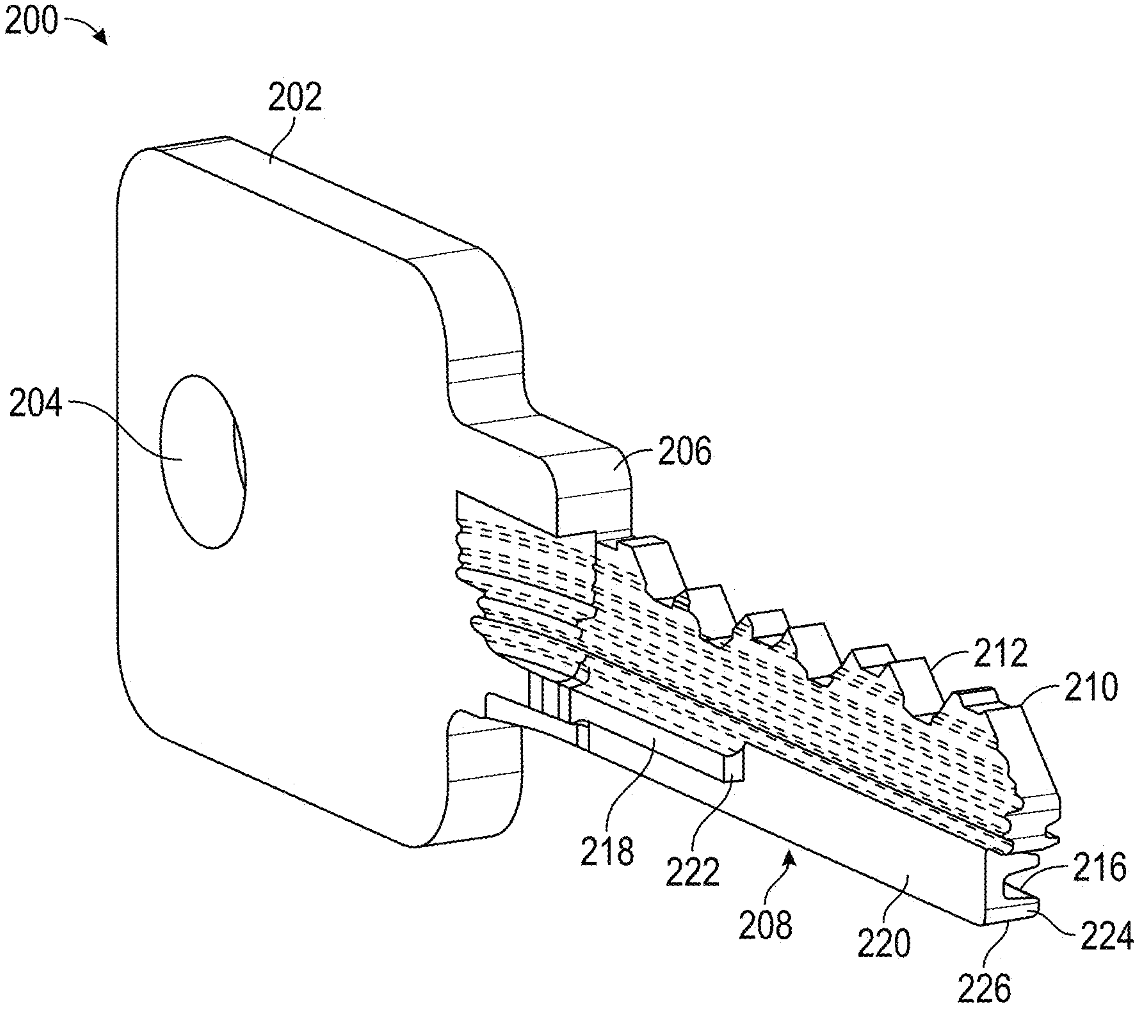
FIG. 29 is a perspective view of a first example of a first level key with a slider control rib located at a first position on a blade of the key.
Figure 31:
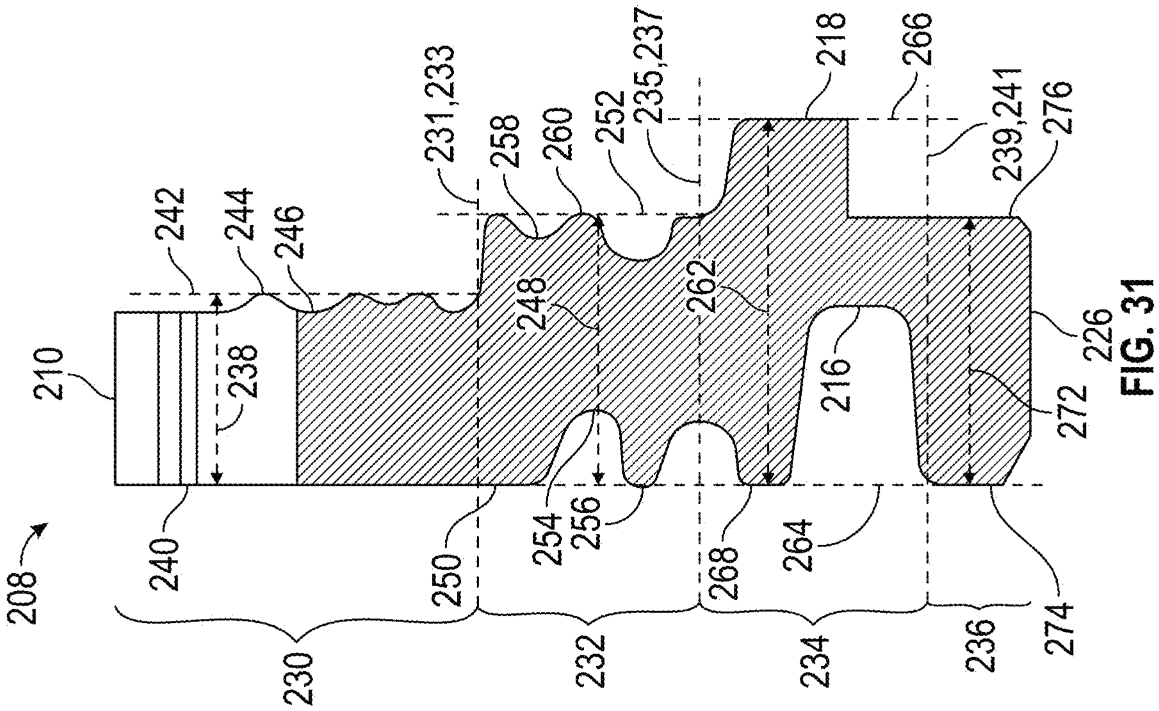
FIG. 31 is a cross section of the blade of the first level key along the line G-G of FIG. 30.
Figure 30:
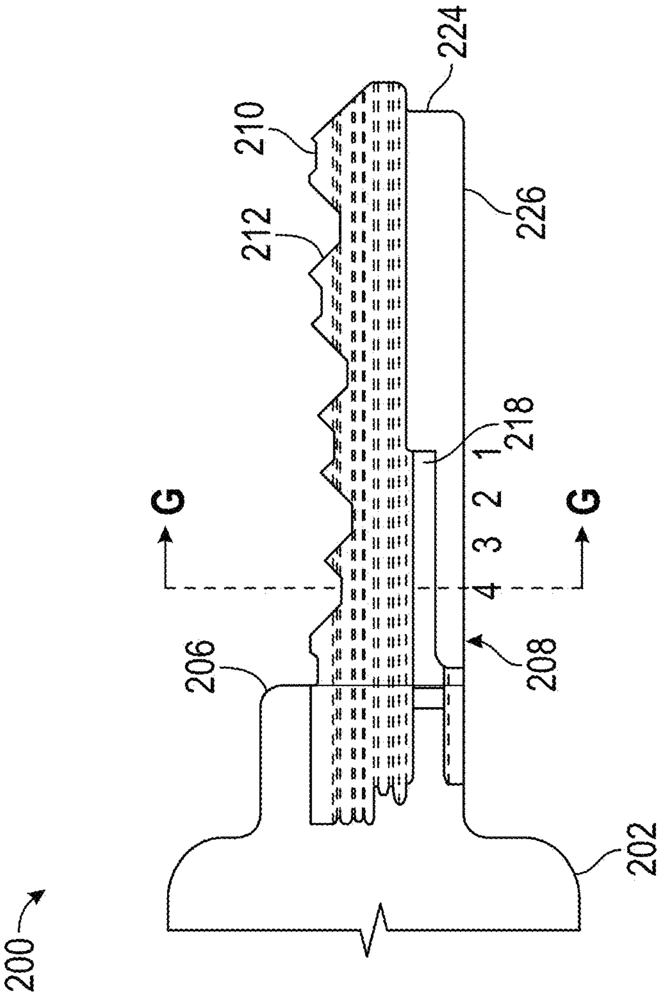
FIG. 30 is a side view of the first level key shown in FIG. 29.

A first example of a first level key 200 is shown in FIGS. 29-31. FIG. 29 is a perspective view of an example of a first level key 200 of the hierarchical lock system. Key 200 includes a bow 202, which may include a key ring hole 204, a shoulder, or key stop, 206, a key blade 208, and a slider control rib 218 located at a first position on the blade 208 of the key. Key blade 208 includes a biting edge 210 having cuts 212 for positioning tumbler assemblies 90 of first security level cylinder lock 10 and tumbler pin assemblies of a second security level cylinder lock. For a key blank for making key 200, key blade 208 has a bitting edge 210 and cuts 212 are cut into the edge 210 in a key cutting process.

Control rib 218 formed on a side of the key blade 208 extends for a specified distance along the key blade 208 from the shoulder 206. Key blade 208 includes a slider cut 220, which is intended to move past the slider (not shown) when key blade 208 is inserted into a keyway, and control rib 218 includes a slider control surface 222 at a distal end of the rib 218, which is intended to engage a slider control surface, when key blade 208 is inserted into the keyway. A distal end of the key blade has a tip stop 224.

FIG. 30 is a side view of the first level key 200 shown in FIG. 29, and FIG. 31 is a cross section of a blade 208 of the first level key 200 along the line G-G of FIG. 30. First level key 200 is configured for use in the first security level cylinder lock 10 or a second security level cylinder lock of the same hierarchical lock system. Each first level key blade 208 has a top edge (i.e., bitting edge 210), a bottom edge 226, a first side, and a second side opposite the first side on which the control rib 218 is located. At any transverse cross section through the blade 208 and the control rib 218, the key blade 208 is divided into at least four segments between the top edge 210 and the bottom edge 226 for at least a portion of a length of the key blade 208.

Referring to FIG. 31, key blade 208 includes a first blade segment 230 extending between first edge 210 of the key blade and a lower boundary 231. Lower boundary 231 does not necessarily correspond to any physical feature of the key blade 208 and may be an imaginary line dividing one distinct segment of the key blade 208 from another distinct segment of the key blade 208. First blade segment 230 has a first width 238 from an outermost part of the first side (or first side boundary) 240 of the first blade segment 230 to an outermost part of the second side (or second side boundary) 242 of the first blade segment 230. The first width 238 of the first blade segment 230 is not greater than the first width 308 of the first keyway section 300 (see FIG. 2) so that first blade segment 230 can be inserted into first keyway section 300, and the first blade segment 230 includes key bitting cuts 212 on first edge 210 for manipulating the primary locking mechanism (e.g., elevating the tumbler pin assemblies 90) of each first security level lock 10 and each second security level lock from the locked positions to the unlocked positions. First blade segment 230 contains one or more ridges 244 (which may have the same or different widths and depths) and one or more grooves 246 (which may have the same or different widths and depths) on the second side 242, and the outermost part of the second side 242 is represented by a dashed line that is tangent to the peaks of the ridges 244. Groove(s) 246 of first blade segment 230 conform to ridge(s) 316 of first keyway section 300, and ridge(s) 244 of first blade segment 230 conform to groove(s) 314 of first keyway section 300.

The first blade segment of a key blank for forming first level key 200 is configured to be engaged by a bit cutting implement for forming bitting cuts 212 into the top edge 210.

Key blade 208 includes a second blade segment 232 that is adjacent to—and may be contiguous with—the first blade segment 230 and extending between an upper boundary 233 that coincides with lower boundary 231 of first blade segment 230 and a lower boundary 235. Lower boundary 235 and upper boundary 233 do not necessarily correspond to any physical features of the key blade 208 and may be imaginary lines dividing one distinct segment of the key blade 208 from another distinct segment of the key blade 208. Second blade segment 232 has a second width 248 from an outermost part of the first side (or first side boundary) 250 of the second blade segment 232 to an outermost part of the second side (or second side boundary) 252 of the second blade segment 232. First side 250 of second blade segment 232 may be coplanar with first side 240 of first blade segment 230.

First side 250 of second blade segment 232 may contain one or more ridges 256 (which may have the same or different widths and depths) conforming to groove(s) 326 of second keyway section 302 and one or more grooves 254 (which may have the same or different widths and depths) conforming to ridge(s) 328 of second keyway section 302. Second side 252 of second blade segment 232 may contain one or more ridges 260 (which may have the same or different widths and depths) conforming to groove(s) 330 of second keyway section 302 and one or more grooves 258 (which may have the same or different widths and depths) conforming to ridge(s) 332 of second keyway section 302. The outermost part of the first side 250 of second blade segment 232 is represented by a dashed line that is tangent to the peaks of the ridges 256, and the outermost part of the second side 252 of second blade segment 232 is represented by a dashed line that is tangent to the peaks of the ridges 260.

The number of and/or positions of groove(s) 254, 258 and ridge(s) 256, 260 relative to the bottom edge 226 and top edge 210 of the key blade can be varied to define different families of key profiles for different hierarchical lock systems.

Second width 248 of the second blade segment 232 is greater than the first width 238 of the first key blade 230 segment. Moreover, the second width 248 of the second blade segment 232 is not greater than the second width 320 of the second keyway section 302 so that second blade segment 232 can be inserted into second keyway section 302, but the second width 248 of the second blade segment 232 is greater than the first width 308 of the first keyway section 300.

Key blade 208 includes a third blade segment 234 that is adjacent to—and may be contiguous with—the second blade segment 232 and extending between an upper boundary 237 that coincides with lower boundary 235 of second blade segment 232 and a lower boundary 239. Lower boundary 239 and upper boundary 237 do not necessarily correspond to any physical features of the key blade 208 and may be imaginary lines dividing one distinct segment of the key blade 208 from another distinct segment of the key blade 208. Third blade segment 234 has a third width 262 from an outermost part of the first side (first side boundary) 264 of third blade segment 234 to an outermost part of the second side (second side boundary) 266 within the third blade segment 234. First side 264 of third blade segment 234 may be coplanar with first side 250 of second blade segment 232.

Part of the second side 266 of third blade segment 234 corresponds to control rib 218 that is received within the control groove 344 of the keyway 80 of each first security level lock and each second security level lock. Control rib 218 is configured to move the slider of the auxiliary locking mechanism 120 of each first security level lock from the locked position to the unlocked position. The third width 262 of the third blade segment 234 is greater than the second width 248 of the second blade segment 232. Moreover, the third width 262 of the third blade segment 234 is not greater than the third width 334 of the third keyway section 304 so that third blade segment 234 can be inserted into third keyway section 304, and the third width 262 of the third blade segment 234 is greater than the second width 320 of the second keyway section 302.

First side 264 of third blade segment 234 may contain one or more ridges 268 conforming to groove(s) 340 of third keyway section 304 and at least part of a registry groove 216, which may be a paracentric groove, conforming to registry ridge 342 of third keyway section 304. Different keyway/key family profiles can be differentiated by moving the registry groove and registry ridge up and down along the key and keyway, respectively. The outermost part of the first side 264 of third blade segment 234 is represented by a dashed line that is tangent to the peak(s) of the ridge(s) 268, and the outermost part of the second side 266 of third blade segment 234 corresponds to the top of the control rib 218 and is represented by a dashed line that is tangent to the top of control rib 218.

Key blade 208 includes a fourth blade segment 236 that is adjacent to—and may be contiguous with—the third blade segment 234 and extending between an upper boundary 241 that coincides with lower boundary 239 of third blade segment 234 and bottom edge 226 of the blade 208. Upper boundary 241 does not necessarily correspond to any physical feature of the key blade 208 and may be an imaginary line dividing one distinct segment of the key blade 208 from another distinct segment of the key blade 208. Fourth blade segment 236 has a fourth width 272 from an outermost part of the first side (first side boundary) 274 of the fourth blade segment 236 to an outermost part of the second side (second side boundary) 276 within the fourth blade segment 236. First side 274 of fourth blade segment 236 may be coplanar with first side 264 of third blade segment 234. Second side 276 corresponds to a portion of slider cut 220.

The fourth width 272 of the fourth blade segment 236 is equal to the second width 248 of the second blade segment 232 and is less than the third width 262 of the third blade segment 234—and thus, the rib 218 is positioned above the bottom of a profile of the key blade 208. Moreover, the fourth width 272 of the fourth blade segment 236 is not greater than the fourth width 346 of the third keyway section 306 so that fourth blade segment 236 can be inserted into fourth keyway section 306.

The foregoing description of first level key 200 further applies to a key blank having four profile segments and configured to receive the bitting cuts, grooves, ridges, and control rib described to form a first level key 200.

Figure 37:
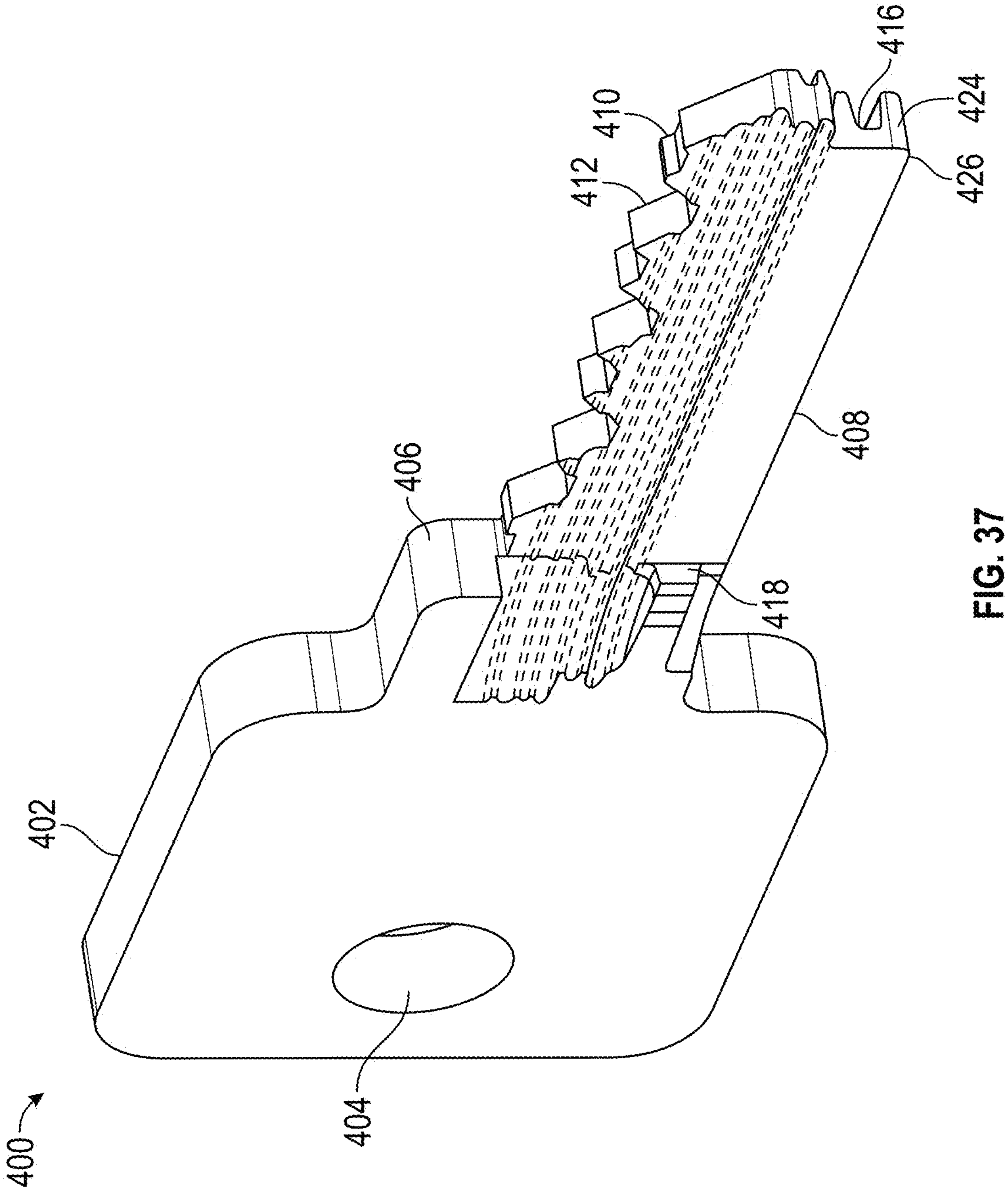
FIG. 37 is a perspective view of an example of a second level key with a blocking rib located on a blade of the key.
Figure 39:
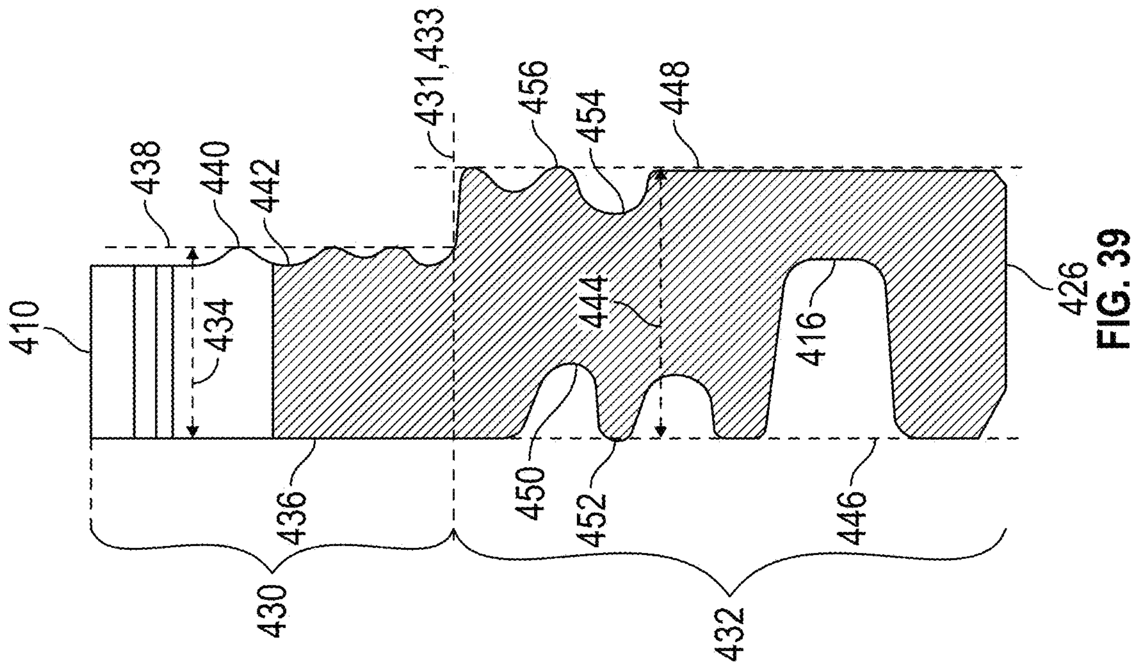
FIG. 39 is a cross section of the blade of the second level key along the line J-J of FIG. 38.
Figure 38:
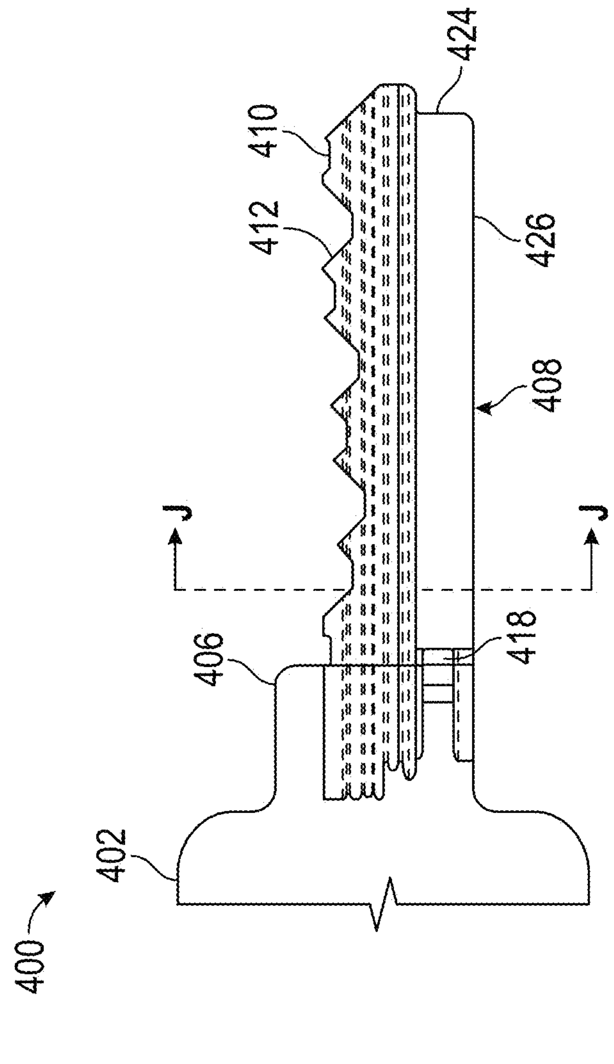
FIG. 38 is a side view of the second level key shown in FIG. 37.

An example of a second level key 400 is shown in FIGS. 37-39. Second level key 400 is configured to operate each second security level lock of a hierarchical lock system but is not able to operate any first security level lock. FIG. 37 is a perspective view of an example of a second level key 400 of the hierarchical lock system. Second level key 400 is configured for use in a second level security level cylinder lock. Key 400 includes a bow 402, which may include a key ring hole 404, a shoulder, or key stop, 406, and a key blade 408. Key blade 408 lacks a slider control rib but includes a blocking rib 418. Key blade 408 includes a biting edge 410 having cuts 412 for positioning tumbler assemblies 90 of a second security level cylinder lock. In one example, cuts 412 of second level key 400 would be identical to cuts 212 of first level key 200 within the same hierarchical lock system. The blocking rib 418 is formed on a side of the key blade 408 and extends for a short distance from the bow 402. A distal end of the key blade has a tip stop 424.

FIG. 38 is a side view of the second level key 400 shown in FIG. 37, and FIG. 39 is a cross section of the blade 408 of the second level key 400 along the line J-J of FIG. 38. Each second level key blade 408 has a top edge (i.e., bitting edge 410), a bottom edge 426, a first side, and a second side opposite the first side on which the blocking rib 418 is located. At any transverse cross section through the blade 408, the key blade 208 is divided into at least two segments between the top edge 410 and the bottom edge 426 of the key blade 408.

Referring to FIG. 39, second level key blade 408 includes a first blade segment 430 extending between the top edge 410 of the key blade 408 and a lower boundary 431. Lower boundary 431 does not necessarily correspond to any physical feature of the key blade 408 and may be an imaginary line dividing one distinct segment of the key blade 408 from another distinct segment of the key blade 408. First blade segment 430 has a first width 434 from an outermost part of the first side (or first side boundary) 436 to an outermost part of the second side (or second side boundary) 438 within the first blade segment 430. The first width 434 of the first blade segment 430 is not greater than the first width 308 of the first keyway section 300 so that first blade segment 430 can be inserted into first keyway section 300. First blade segment 430 includes key bitting cuts 412 for manipulating the primary locking mechanism (e.g., elevating the tumbler pin assemblies 90) of each second security level lock from the locked positions to the unlocked positions. Key bitting cuts 412 may be the same as key bitting cuts 212 of the first blade segment 230 of key blade 208 of first level key 200 within the same hierarchical lock system. First blade segment 430 may contain one or more ridges 440 (which may have the same or different widths and depths) and one or more grooves 442 (which may have the same or different widths and depths) on the second side 438, and the outermost part of the second side 438 is represented by a dashed line that is tangent to the peaks of the ridges 440. Groove(s) 442 of first blade segment 430 conform to ridge(s) 316 of first keyway section 300, and ridge(s) 440 of first blade segment 430 conform to groove(s) 314 of first keyway section 300.

The first blade segment of a key blank for forming second level key 400 is configured to be engaged by a bit cutting implement for forming bitting cuts 412 into the top edge 410.

Key blade 408 includes a second blade segment 432 that is adjacent to—and may be contiguous with—the first blade segment 430 and extending between an upper boundary 433 that coincides with lower boundary 431 of first blade segment 430 and bottom edge 426. Upper boundary 433 does not necessarily correspond to any physical feature of the key blade 408 and may be imaginary lines dividing one distinct segment of the key blade 408 from another distinct segment of the key blade 408. Second blade segment 432 has a second width 444 from an outermost part of the first side (or first side boundary) 446 of the second blade segment 432 to an outermost part of the second side (or second side boundary) 448 of the second blade segment 432. First side 446 of second blade segment 432 may be coplanar with first side 436 of first blade segment 430.

First side 446 of second blade segment 432 may contain one or more ridges 452 (which may have the same or different widths and depths) conforming to groove(s) 326 of second keyway section 302 and one or more grooves 450 (which may have the same or different widths and depths) conforming to ridge(s) 328 of second keyway section 302. Second side 448 of second blade segment 432 may contain one or more ridges 456 (which may have the same or different widths and depths) conforming to groove(s) 330 of second keyway section 302 and one or more grooves 454 (which may have the same or different widths and depths) conforming to ridge(s) 332 of second keyway section 302. First side 446 of second blade segment 432 may include a registry groove 416, which may be a paracentric groove, conforming to registry ridge 342 of third keyway section 304. A portion of the outermost part of the first side 446 of second blade segment 432 is represented by a dashed line that is tangent to the peaks of the ridges 452, and a portion of the outermost part of the second side 448 of second blade segment 432 is represented by a dashed line that is tangent to the peaks of the ridges 456.

Second width 444 of the second blade segment 432 is greater than the first width 434 of the first blade segment 430. Moreover, the second width 444 of the second blade segment 432 is not greater than the second width 320 of the second keyway section 302, third width 334 of the third keyway section 304, and the fourth width 346 of the fourth keyway section 306 so that second blade segment 432 can be inserted into second keyway section 302, third keyway section 304, and fourth keyway section 306. Furthermore, the second width 444 of the second blade segment 432 is greater than the first width 308 of the first keyway section 300.

Referring to FIGS. 37 and 38, the second level key 400 has a blocking rib 418 positioned with respect to the key blade 408 so as to block access to the control groove 344 of the third keyway section 304 when the blade 408 of the second level key 400 is inserted into the keyway 80 as described below. The blocking rib 418 is too short, however, to contact the slider and operate the auxiliary locking mechanism.

The foregoing description of second level key 400 further applies to a key blank having two profile segments and configured to receive the bitting cuts, grooves, and ridges described to form a second level key 400.

Figure 32:
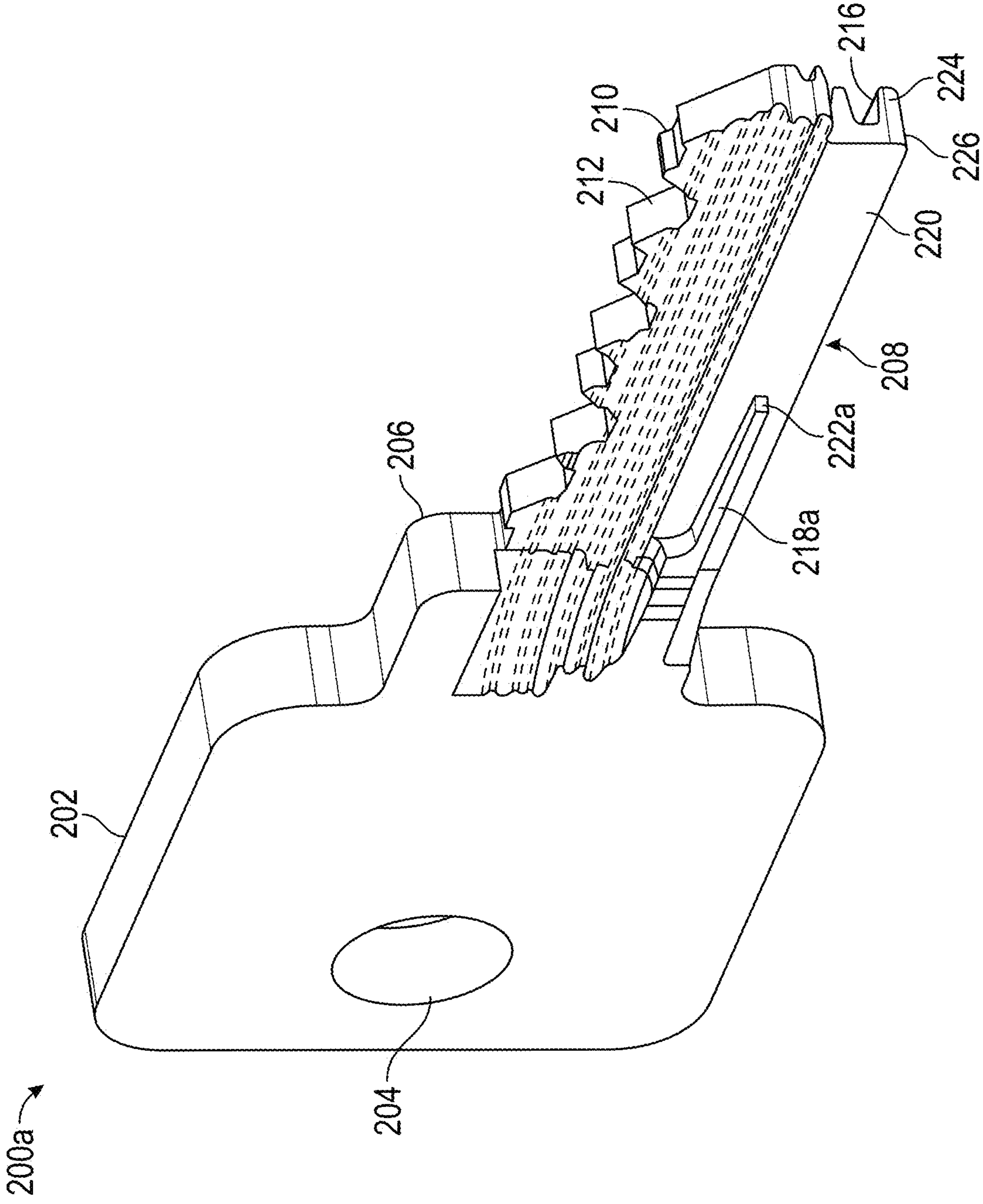
FIG. 32 is a perspective view of a second example of a first level key with a slider control rib located at a second position on a blade of the key.
Figure 34:
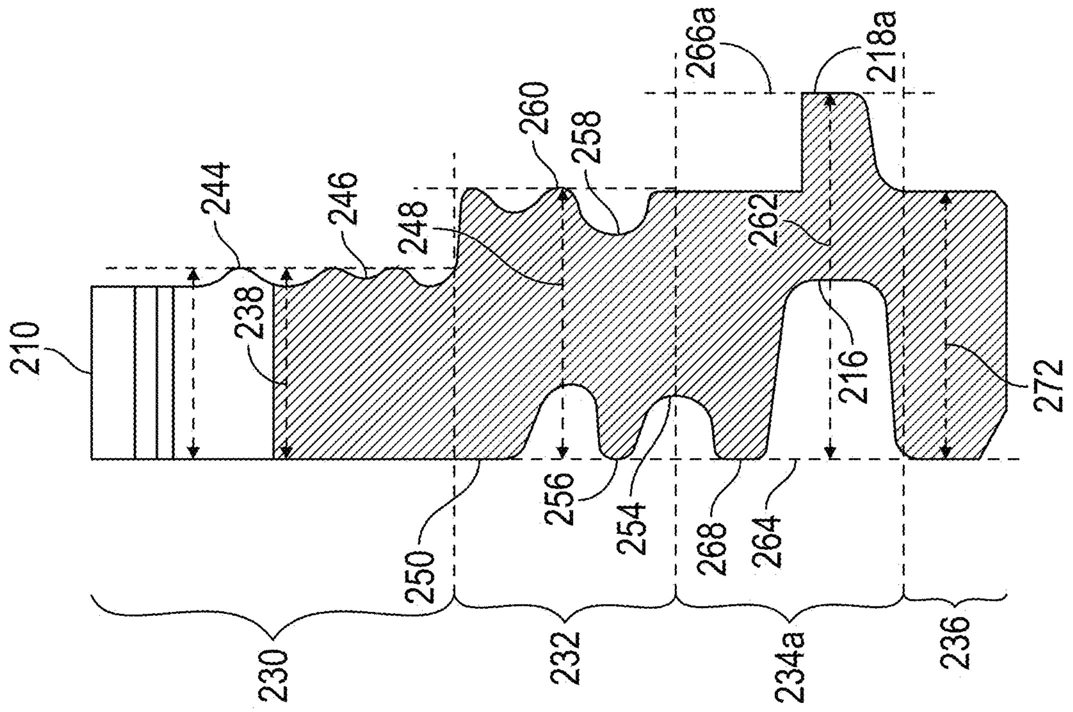
FIG. 34 is a cross section of the blade of the first level key along the line H-H of FIG. 33.
Figure 33:
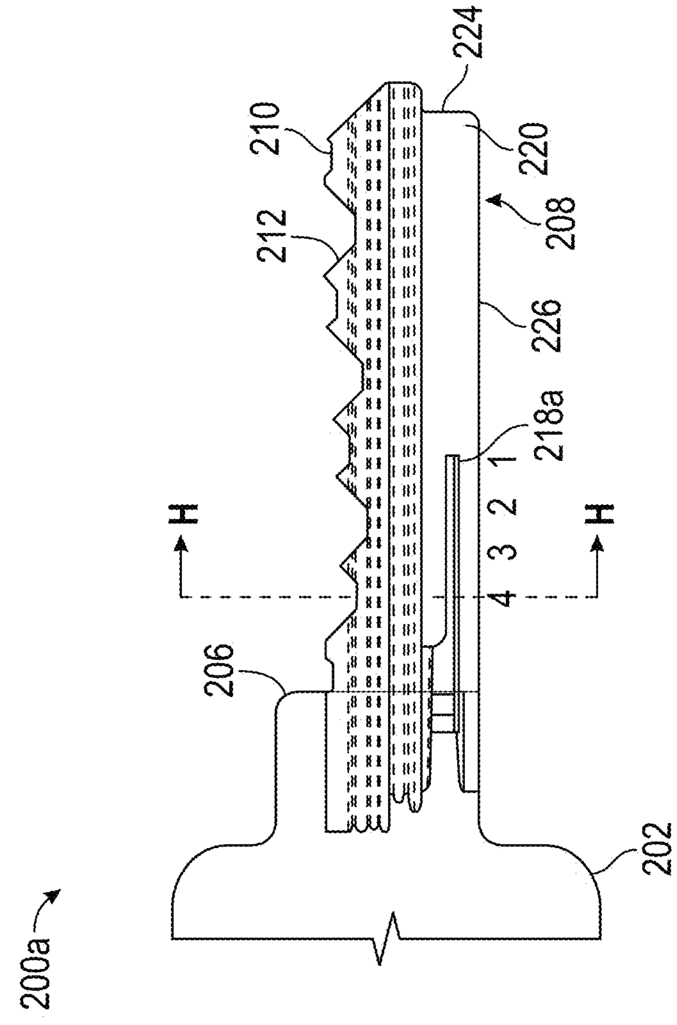
FIG. 33 is a side view of the first level key shown in FIG. 32.

A second example of a first level key 200*a* is shown in FIGS. 32-34. FIG. 32 is a perspective view of the second example of a first level key 200*a* of the hierarchical lock system. Like first level key 200 shown in FIGS. 29-31, key 200*a* includes a bow 202, which may include a key ring hole 204, a shoulder, or key stop, 206, a key blade 208 and a slider control rib 218*a* located at a second position on a blade 208 of the key. Key blade 208 includes a biting edge 210 having cuts 212 for positioning tumbler assemblies 90 of first security level cylinder lock 10 and second security level cylinder lock. For a key blank for making key 200*a*, key blade 208 has a bitting edge 210 and cuts 212 are cut into the edge 210 in a key cutting process. Control rib 218*a* formed on a side of the key blade 208 extends for a specified distance along the key blade 208 from the shoulder 206. Key blade 208 includes a slider cut 220, which is intended to move past the slider (not shown) when key blade 208 is inserted into a keyway, and control rib 218 includes a slider control surface 222*a* at a distal end of the rib 218*a*, which is intended to engage a slider control surface. A distal end of the key blade has a tip stop 224 when key blade 208 is inserted into a keyway.

FIG. 33 is a side view of the first level key 200*a* shown in FIG. 32, and FIG. 34 is a cross section of a blade 208 of the first level key 200*a* along the line H-H of FIG. 33. First level key 200*a* is configured for use in a first security level cylinder lock having a different slider configuration than first security level cylinder lock 10 or the second security level cylinder lock. Each first level key blade 208 has a top edge (i.e., bitting edge 210), a bottom edge 226, a first side, and a second side opposite the first side on which the control rib 218*a* is located. At any transverse cross section through the blade 208 and the control rib 218*a*, the key blade 208 is divided into at least four segments between the top edge 210 and the bottom edge 226 for at least a portion of a length of the key blade 208.

Referring to FIG. 34, key blade 208 of first level key 200*a* includes a first blade segment 230 that is identical to first blade segment 230 of key blade 208 of first level key 200 of the same hierarchical lock system. That is, first blade segment 230 of first level key 200*a* has the same first width 238, the same key bitting cuts 212, the same one or more ridges 244 (which may have the same or different widths and depths), and the same one or more grooves 246 (which may have the same or different widths and depths) as first blade segment 230 of first level key 200 of the same hierarchical lock system. Groove(s) 246 of first blade segment 230 of first level key 200*a* conform to ridge(s) 316 of first keyway section 300, and ridge(s) 244 of first blade segment 230 of first level key 200*a* conform to groove(s) 314 of first keyway section 300.

The first blade segment of a key blank for forming first level key 200*a* is configured to be engaged by a bit cutting implement for forming bitting cuts 212 into the top edge 210.

Key blade 208 of first level key 200*a* includes a second blade segment 232 that is adjacent to—and may be contiguous with—the first blade segment 230 that is identical to second blade segment 232 of key blade 208 of first level key 200 of the same hierarchical lock system. That is, first blade segment 230 of first level key 200*a* has the same second width 248, the same one or more ridges 256 (which may have the same or different widths and depths) conforming to groove(s) 326 of second keyway section 302, the same one or more grooves 254 (which may have the same or different widths and depths) conforming to ridge(s) 328 of second keyway section 302, the same one or more ridges 260 (which may have the same or different widths and depths) conforming to groove(s) 330 of second keyway section 302, and the same one or more grooves 258 (which may have the same or different widths and depths) conforming to ridge(s) 332 of second keyway section 302 as first blade segment 230 of first level key 200. Key blade 208 of first level key 200*a* includes a third blade segment 234*a* that is adjacent to—and may be contiguous with—the second blade segment 232. Third blade segment 234*a* has a third width 262 from an outermost part of the first side (first side boundary) 264 of third blade segment 234*a* to an outermost part of the second side (second side boundary) 266*a* within the third blade segment 234*a*. Third width 262 of third blade segment 234*a* of key 200*a* is the same as third width 262 of third segment 234 of key 200.

Part of the second side 266*a* of third blade segment 234*a* corresponds to control rib 218*a* that is received within the control groove 344 of the keyway 80 of each first security level lock and each second security level lock. Control rib 218*a* is configured to move the slider of the auxiliary locking mechanism 120 of each first security level lock from the locked position to the unlocked position.

Key blade 208 of first level key 200*a* includes a fourth blade segment 236 that is adjacent to—and may be contiguous with—the third blade segment 234*a* that is identical to fourth blade segment 236 of key blade 208 of first level key 200 of the same hierarchical lock system. That is, fourth blade segment 236 of first level key 200*a* has the same fourth width 272 as fourth blade segment 236 of first level key 200*a*. Control rib 218*a* is positioned above the bottom of the profile of the blade 208 of first level key 200*a*.

As can be appreciated by comparing FIGS. 29-31 with FIGS. 32-34, control rib 218*a* is positioned closer to the bottom edge 226 of blade 208 than control rib 218. Moreover, the height of each of control rib 218 and control rib 218*a* is less than the height of control groove 344 of third keyway section 304 of the keyway 80, and the combined height of control rib 218 and control rib 18*a* is not greater than the height of control groove 344 of third keyway section 304 of the keyway 80.

The foregoing description of first level key 200*a* further applies to a key blank having four profile segments and configured to receive the bitting cuts, grooves, ridges, and control rib described to form a first level key 200*a*.

Referring to FIGS. 2 and 39, the portion of keyway 80 that accommodates the profile of key blade 408 of second level key 400 may be referred to as the primary keyway, or primary portion of the keyway, and includes keyway sections 300, 302, and 306 as well as keyway section 304 with the exception of control groove 344. The lower pins 92 of tumbler pin assemblies 90 align with top edge of the key and the key bitting along the primary keyway. The primary keyway also defines the unique keyway profile and keyway families via the grooves 326, 330 and ridges 328, 332 of second keyway section 302, and, in some embodiments, via groove(s) 314 and ridge(s) 316 of first keyway section 300. The primary keyway may also include the registry ridge 342 of third keyway section 304.

Referring to FIGS. 2, 31, and 34, the portion of keyway 80 outside the primary keyway that is required to accommodate control rib 218 of first level key 200 or control rib 218*a* of first level key 200*a*—i.e., control groove 344 of keyway section 304—may be referred to as the secondary keyway, or secondary portion of the keyway. The secondary keyway allows a first level key having a blade with a control rib to operate an auxiliary locking mechanism to allow cylinder lock to open.

The profile of key blade 408 of second level key 400 is referred to as the primary key profile and includes key blade segments 430 and 432. A control rib on the blade, such as control rib 218 of a first level key 200 or control rib 218*a* of a first level key 200*a* may be referred as the secondary blade element and is accommodated by the secondary keyway—i.e., control groove 344 of keyway section 304.

Both first and second security level locks include keyways having primary keyways (or keyway portions) and secondary keyways (or keyway portions). The secondary keyway of a first level security lock allows the first level key 200 or 2008 with control rib 218 or 218*a* to be inserted into the keyway. The secondary keyway of a second level security lock allows the first level key 200 or 2008 with control rib 218 or 218*a* to be inserted into the keyway and allows the second level key 400 with blocking rib 418 to be inserted into the keyway.

Figure 19:
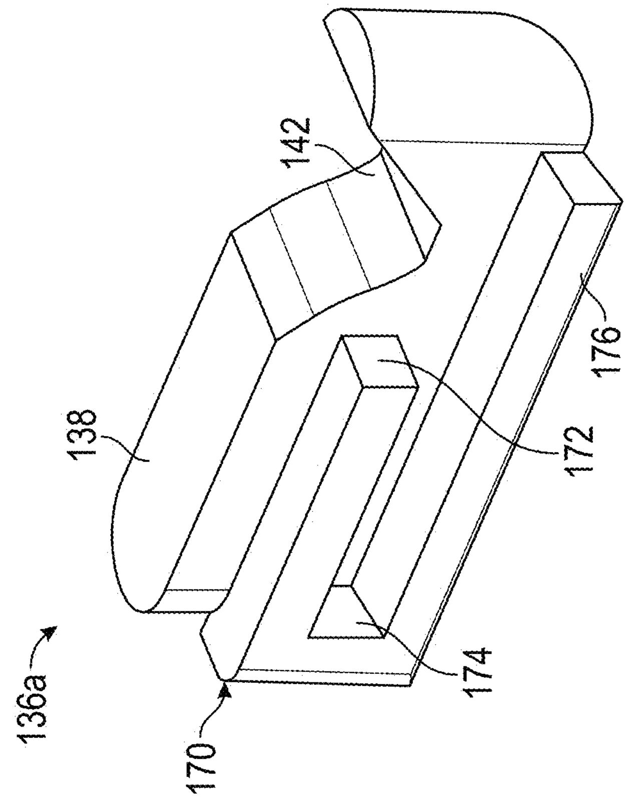
FIG. 19 is a first end top perspective view of an embodiment of a slider.
Figure 20:
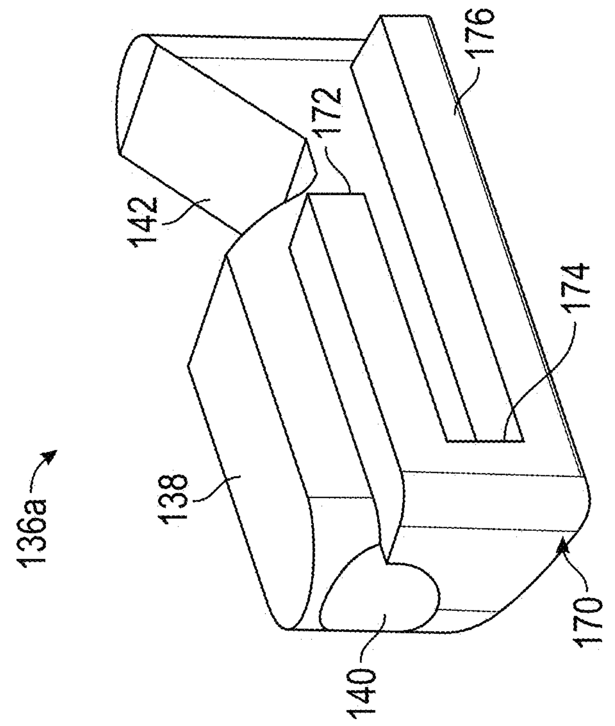
FIG. 20 is a second end top perspective view of the slider of FIG. 19.

Examples of different slider configurations are shown in FIGS. 19-28. FIGS. 19 and 20 show a first example of a slider configuration 136*a* having a rear body portion 138, notch 142, and a spring hole 140. A side projection 170 is attached to or is an integral part of the slider 136*a* and is formed (e.g. machined) to have one or more control surfaces positioned to be engaged by control surfaces of a first level key inserted into the first security level lock to position the slider 136*a* so as to align the notch 142 with the auxiliary locking pin 122. In the example illustrated in FIGS. 19 and 20, side projection 170 includes a first control surface 172 positioned to be engaged by an associated control surface 222 of control rib 218 of first level key 200 and a second control surface 174 located below first control surface 172 and positioned to be engaged by an associated control surface 222*a* of control rib 218*a* of a first level key 200*a*. The positions of the first and second control surfaces 172, 174 are coordinated with the lengths of the associated control ribs 218, 218*a*, respectively, so that each rib moves the slider 136*a* to a position at which the auxiliary locking pin 122 is aligned with the notch 142. If an incorrect key is inserted into the lock—i.e., the length of the control rib 218 or 218*a* is not coordinated with the position of the control surface 172 or 174, the slider 136*a* will not be moved to a position at which the auxiliary locking pin 122 is aligned with the notch 142, and the first security level lock cannot be opened.

Figure 27:
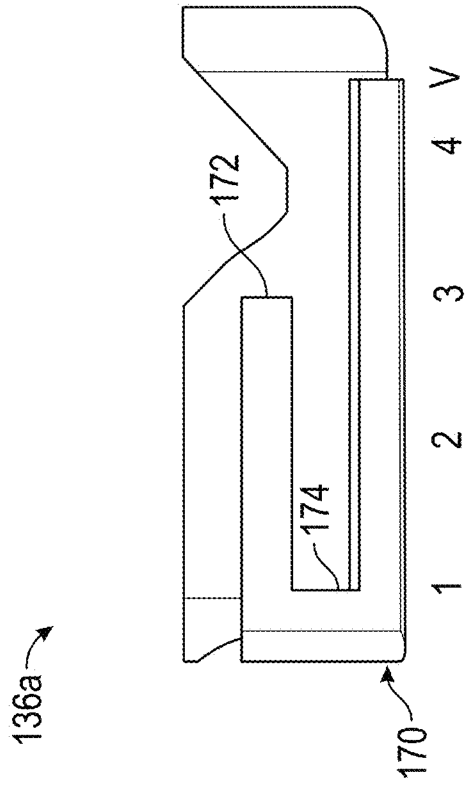
FIG. 27 is a side view of the slider of FIGS. 19 and 20 illustrating two of multiple possible control surface variations.

By varying the length of the control rib 218 and/or the control rib 218*a* and the positions of the control surface 172 and/or the control rib 174 various keying combinations can be achieved. This is illustrated in FIG. 27 in which indicia along a bottom edge of the side projection 170 indicate different predetermined positions at which control surface 172 and control surface 174 may be formed. The predetermined positions of the control surface 172 and control surface 174 are not limited to the positions of the integers 1-2-3-4, but may be at any position between integers 1 and 4.

Similarly, FIG. 30 shows indicia along a bottom edge of control rib 218 to indicate different predetermined positions at which control rib 218 may terminate to form control surface 222, FIG. 33 shows indicia along a bottom edge of control rib 218*a* to indicate different predetermined positions at which control rib 218*a* may terminate to form control surface 222*a*. Again, the positions of the control surface 222 and control surface 222*a* are not limited to the positions of the integers 1-2-3-4, but may be at any position between integers 1 and 4.

A bottom edge 176 of the side projection 170 extends substantially the full length of the slider 136 a and is configured to fill the slider cavity 160 up to the keyway 80 (see also FIG. 10). As shown FIG. 28, slider 136*a* has a bottom surface 146 that may be curved so as to conform to the peripheral shape of the plug 70. Each slider described herein may have a similarly curved bottom surface and side projection for filing the slider cavity 160.

Having two control surfaces 172, 174 on the slider 136*a* allows for a keying possibility whereby the hierarchical lock system includes one or more master first level keys able to open all first security level locks as well as all second security level locks of the system (because all first security level locks and all second security level locks will have the same primary locking mechanisms (e.g., tumbler pin assemblies 90)) and one or more limited first level keys able to open one or more, but not all, first security level locks as well as all second security level locks of the system. That is, every first security level lock of such as system will have a slider 136*a* with a second control surface 174 that is at the same predetermined position so that one or more first level keys 200*a* having a control rib 218*a* of the correct length for engaging the second control surface 174 to properly position the slider 136*a* can be provided as master keys able to operate all first security level locks and all second security level locks within the hierarchical lock system. On the other hand, different first security level locks within the same hierarchical lock system may have sliders 136*a* with first control surfaces 172 at different predetermined positions. Thus, the system can include first level keys 200 having ribs 218 of varying lengths and such keys (referred to as limited first level keys) have a control rib configured to engage the first control surface 172 of one or more, but not all, sliders within the system to properly position the slider 136*a* and are thus able to open one or more, but not all, first security level locks and all second security level locks of the hierarchical lock system. Similarly, first control surface 172 may serve as the control surface for the master first level key, and second control surface 174 may serve as the control surface for limited first level keys.

Figure 22:
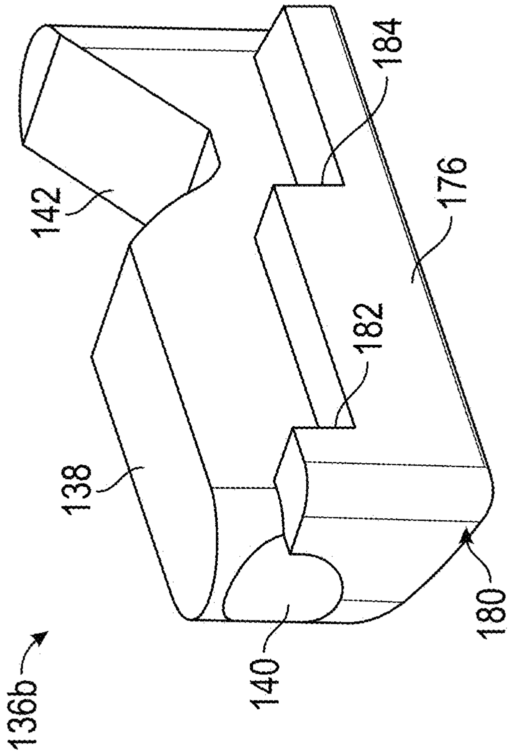
FIG. 22 is a second end top perspective view of the slider of FIG. 21.
Figure 21:
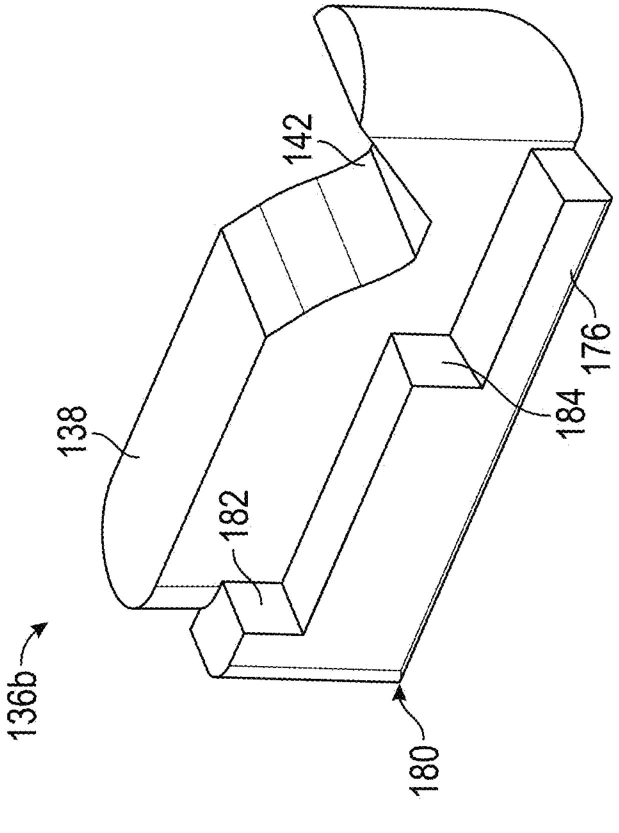
FIG. 21 is a first end top perspective view of an alternative embodiment of a slider.

FIGS. 21 and 22 show a second example of a slider configuration 136*b* having a rear body portion 138, notch 142, and a spring hole 140. A side projection 180 is attached to or is an integral part of the slider 136*b* and is formed (e.g. machined) to have one or more control surfaces positioned to be engaged by control surfaces of a first level key inserted into the first security level lock to position the slider 136*b* so as to align the notch 142 with the auxiliary locking pin 122. In the example illustrated in FIGS. 21 and 22, side projection 180 includes a first control surface 182 positioned to be engaged by an associated control surface 222 of control rib 218 of first level key 200 and a second control surface 184 positioned to be engaged by an associated control surface 222*a* of control rib 218*a* of a first level key 200*a*. The positions of the first and second control surfaces 182, 184 of slider 136*b*, which are different from the positions of first and second control surfaces 172, 174 of slider 136*a*, are coordinated with the lengths of the associated control ribs 218, 218*a*, respectively, so that each rib moves the slider 136*b* to a position at which the auxiliary locking pin 122 is aligned with the notch 142. If an incorrect key is inserted into the lock—i.e., the length of the control rib 218 or 218*a* is not coordinated with the position of the control surface 182 or 184, the slider 136*b* will not be moved to a position at which the auxiliary locking pin 122 is aligned with the notch 142, and the first security level lock cannot be opened. One of first control surface 182 and second control surface 184 may serve as the control surface for a master first level key and the other of first control surface 182 and second control surface 184 may serve as the control surface for limited first level keys.

Figure 23:
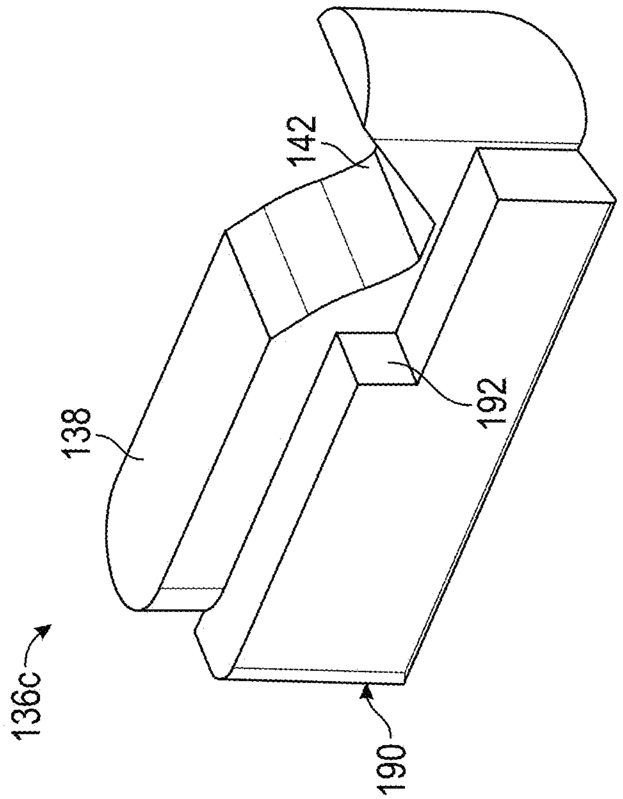
FIG. 23 is a first end top perspective view of a further alternative embodiment of a slider.
Figure 24:
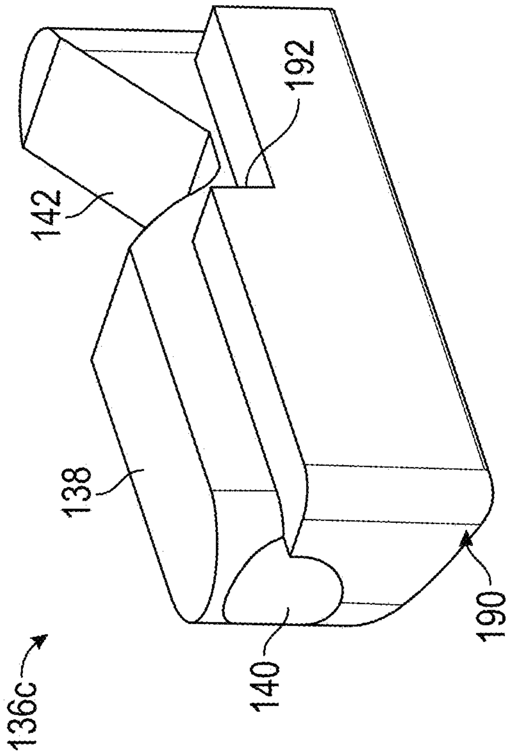
FIG. 24 is a second end top perspective view of the slider of FIG. 23.

FIGS. 23 and 24 show a third example of a slider configuration 136*c* having a rear body portion 138, notch 142, and a spring hole 140. A side projection 190 is attached to or is an integral part of the slider 136*c* and is formed (e.g. machined) to have a control surface positioned to be engaged by a control surface of a first level key inserted into the first security level lock to position the slider 136*c* so as to align the notch 142 with the auxiliary locking pin 122. In the example illustrated in FIGS. 23 and 24, side projection 180 includes only a single control surface 192 positioned to be engaged by an associated control surface 222 of control rib 218 of first level key 200. The position of the first control surface 192 of slider 136*c* is coordinated with the length of the associated control rib 218 so that rib 218 moves the slider 136*c* to a position at which the auxiliary locking pin 122 is aligned with the notch 142. If an incorrect key is inserted into the lock—i.e., the length of the control rib 218 is not coordinated with the position of the control surface 192, the slider 136*c* will not be moved to a position at which the auxiliary locking pin 122 is aligned with the notch 142, and the first security level lock cannot be opened. Having only a single control surface 192, a first security level lock having a slider such as slider 136*c* is not configured to allow for both master first level keys and limited first level keys.

Figure 26:
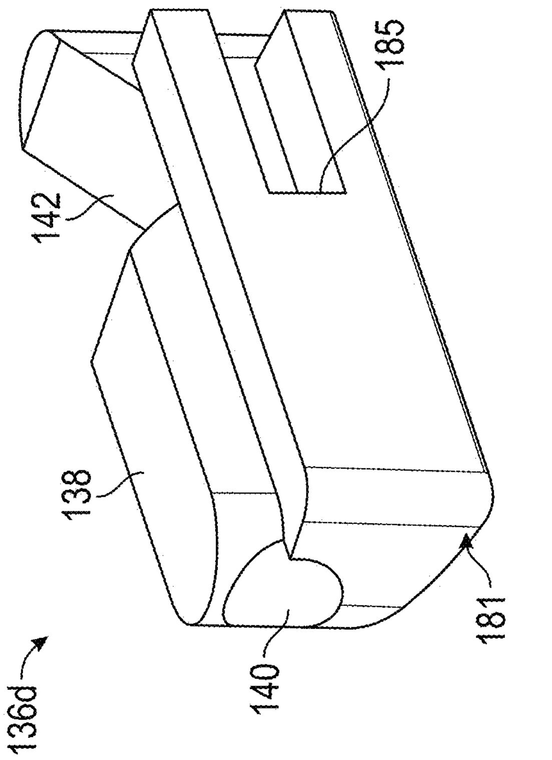
FIG. 26 is a second end top perspective view of the slider of FIG. 25.
Figure 25:
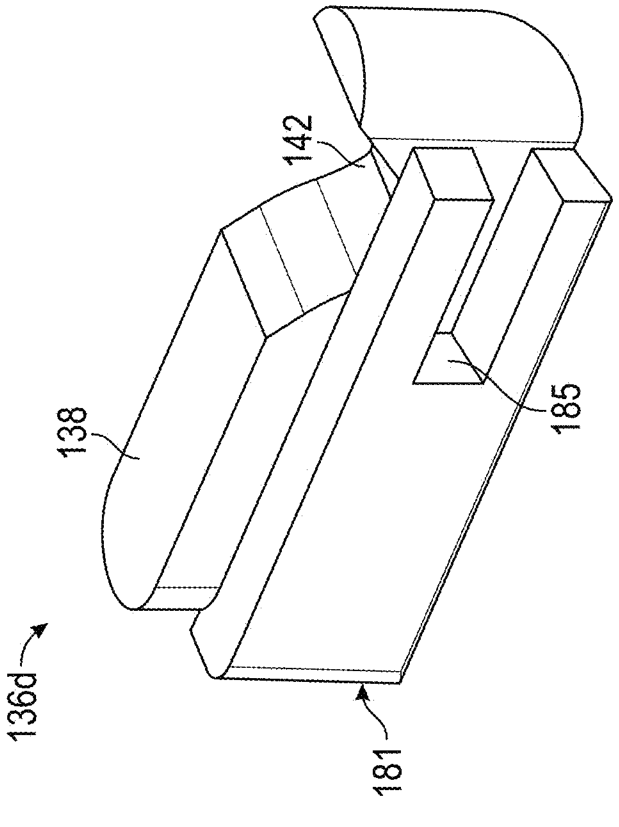
FIG. 25 is a first end top perspective view of a further alternative embodiment of a slider.

FIGS. 25 and 26 show a fourth example of a slider configuration 136*d* having a rear body portion 138, notch 142, and a spring hole 140. A side projection 181 is attached to or is an integral part of the slider 136*d* and is formed (e.g. machined) to have a control surface positioned to be engaged by a control surface of a first level key inserted into the first security level lock to precisely position the slider 136*d* so as to align the notch 142 with the auxiliary locking pin 122. In the example illustrated in FIGS. 25 and 26, side projection 181 includes only a single control surface 185 positioned to be engaged by an associated control surface 222*a* of control rib 218*a* of first level key 200*a*. The position of the first control surface 185 of slider 136*d* is coordinated with the length of the associated control rib 218*a* so that rib 218*a* moves the slider 136*d* to a position at which the auxiliary locking pin 122 is aligned with the notch 142. If an incorrect key is inserted into the lock—i.e., the length of the control rib 218*a* is not coordinated with the position of the control surface 185, the slider 136*d* will not be moved to a position at which the auxiliary locking pin 122 is aligned with the notch 142, and the first security level lock cannot be opened. Having only a single control surface 185, a first security level lock having a slider such as slider 136*d* is not configured to allow for both master first level keys and limited first level keys.

Control components of the auxiliary locking mechanisms, i.e., control surfaces of the sliders—e.g., control surfaces 172 and 174 of slider 136*a*, control surfaces 182 and 184 of slider 136*b*, control surface 192 of slider 136*c*, and control surface 185 of slider 136*d*—extend into the secondary keyway formed by the control groove 344 but do not extend into the primary keyway (i.e., the slider control surfaces do not extend beyond the control groove 344) and thus are only controlled by a key blade having a secondary blade element, such as control rib 218 of first level key 200 or control rib 218*a* of first level key 200*a* that extends into the control groove 344 of the secondary keyway.

FIG. 16 is a cross-section of a first security level lock with a properly bitted first level key 200 inserted into the keyway. Control rib 218 on the blade 208 contacts control surface 172 of slider 136 to move the slider 136 (or rib 218 contacts control surface 182 of slider 136*b* to move the slider 136*b* or rib 218 contacts control surface 192 of slider 136*c* to move the slider 136*c*), against the bias of the slider spring 152, to a second position toward the back of the slider cavity 160. The control surface 172 of the slider 136*a*, control surface 182 of slider 136*b*, control surface 192 of slider 136*c* is blocked from view in FIG. 16 by control rib 218. The tip 128 of the auxiliary locking pin 122 slides along the top of the slider 136 (or slider 136*b* or sider 136*c*) and into the notch 142. With the pin 122 moved into this second position, the upper shaft of pin 122 withdraws from the gap 48, through the auxiliary pin hole 32 formed in the control sleeve 20, so that the pin 122 no longer blocks the plug 70 from rotating within the control sleeve 20. The first level key 200 has top edge bitting cuts 212 on top edge 210 that elevate each of the tumbler pin assemblies 90 into its unlocked position or configuration in which the interface between one of the master wafers 95 and the bottom pin 92 is aligned with the shear line between the plug 70 and the control sleeve 20.

Figure 36:
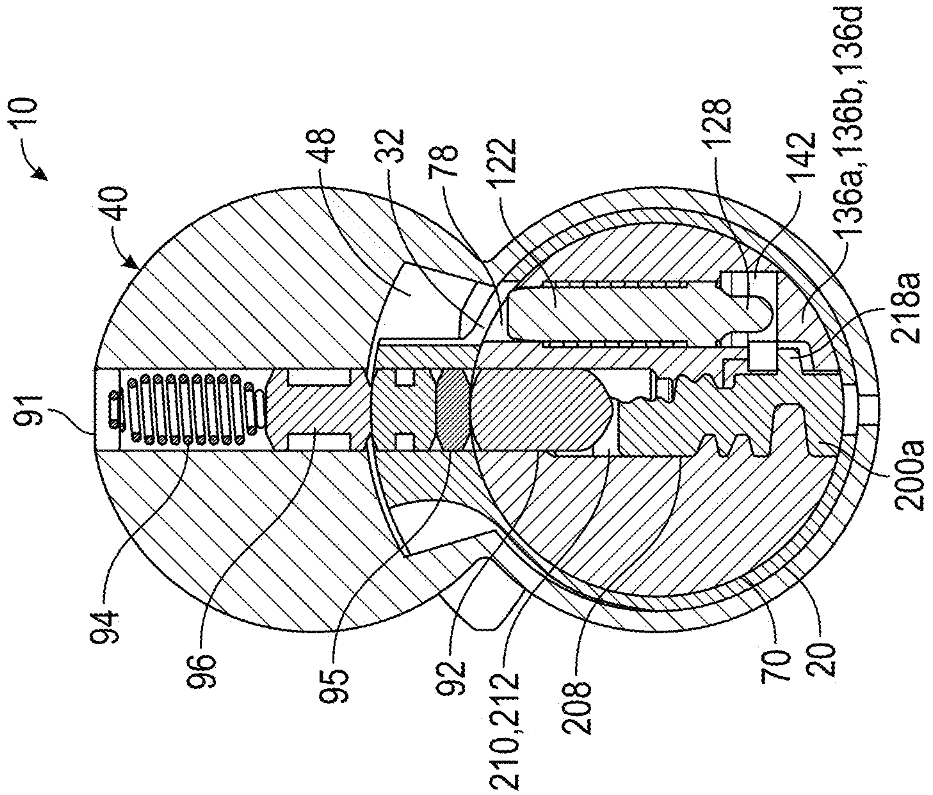
FIG. 36 is a cross-section of the first security level lock along the line E-E in FIG. 35 with an alternate first level key inserted into the keyway.
Figure 35:
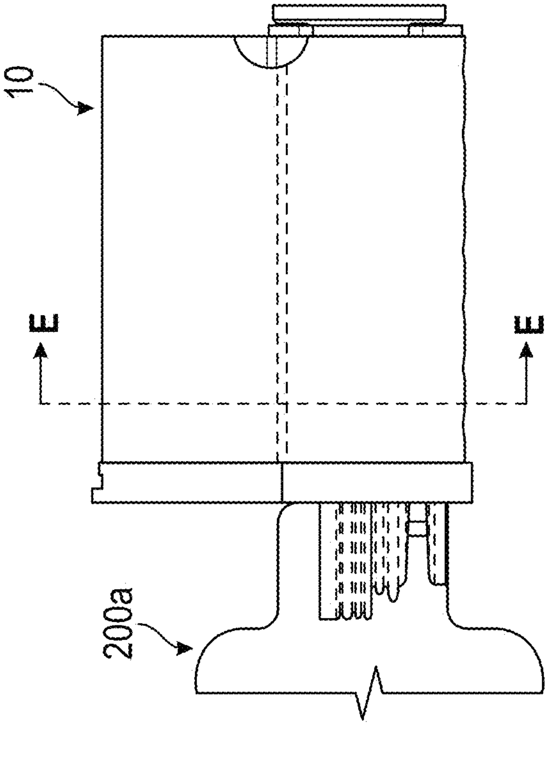
FIG. 35 is a side view of a first security level lock with an alternate first level key inserted into the keyway

FIG. 36 is a cross-section of a first security level lock with a properly bitted first level key 200*a* inserted into the keyway. Control rib 218*a* on the blade 208 contacts control surface 174 of slider 136*a* to move the slider 136*a* (or rib 218*a* contacts control surface 184 of slider 136*b* to move the slider 136*b* or rib 218 contacts control surface 185 of slider 136*d* to move the slider 136*d*), against the bias of the slider spring 152, to a second position toward the back of the slider cavity 160. The control surface 174 of the slider 136*a*, control surface 184 of slider 136*b*, control surface 185 of slider 136*d* is blocked from view in FIG. 36 by control rib 218*a*. The tip 128 of the auxiliary locking pin 122 slides along the top of the slider 136*a* (or slider 136*b* or 136*d*) and into the notch 142. With the pin 122 moved into this second position, the upper shaft of pin 122 withdraws from the gap 48, through the auxiliary pin hole 32 formed in the control sleeve 20, so that the pin 122 no longer blocks the plug 70 from rotating within the control sleeve 20. The first level key 200*a* has top edge bitting cuts 212 on top edge 210 that elevate each of the tumbler pin assemblies 90 into its unlocked position or configuration in which the interface between one of the master wafers 95 and the bottom pin 92 is aligned with the shear line between the plug 70 and the control sleeve 20.

Figure 41:
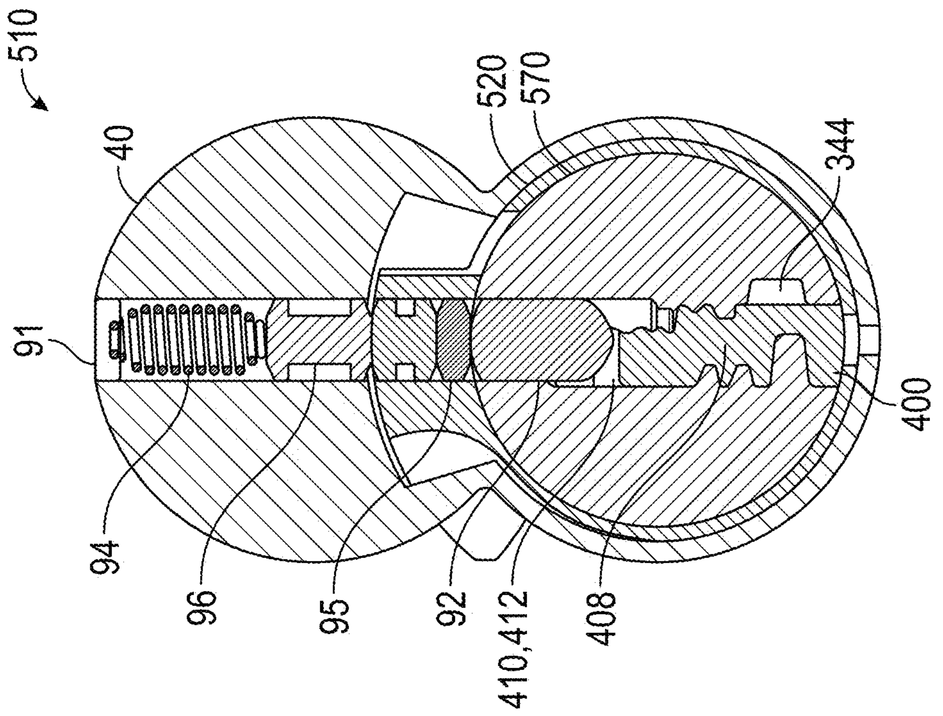
FIG. 41 is a cross section through the second security level lock along the line B-B in FIG. 41.
Figure 40:
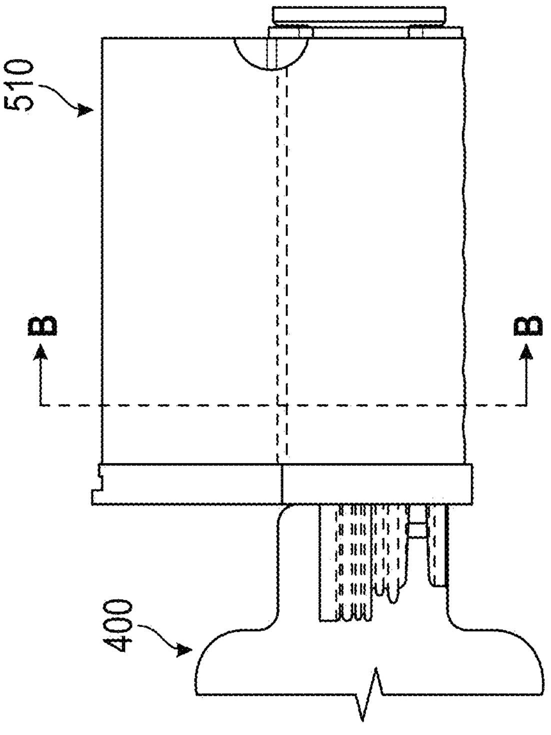
FIG. 40 is a side view of a second level key inserted into a second security level lock.

FIG. 41 is a cross-section of a second security level lock 510 with a properly bitted second level key 400 inserted into the keyway. As described herein, second security level lock 510 lacks an auxiliary locking mechanism (e.g., lacks a slider 122 and a slider 136), and second level key 400 lacks a control rib (e.g., lacks rib 218 or rib 218*a*). The second level key 400 has top edge bitting cuts 412 on top edge 410 that elevate each of the tumbler pin assemblies 90 into its unlocked position or configuration in which the interface between one of the master wafers 95 and the bottom pin 92 is aligned with the shear line between the plug 570 and the control sleeve 520, thereby permitting a plug 570 of lock 500 to rotate within a control sleeve 520 of lock 500.

Figure 42:
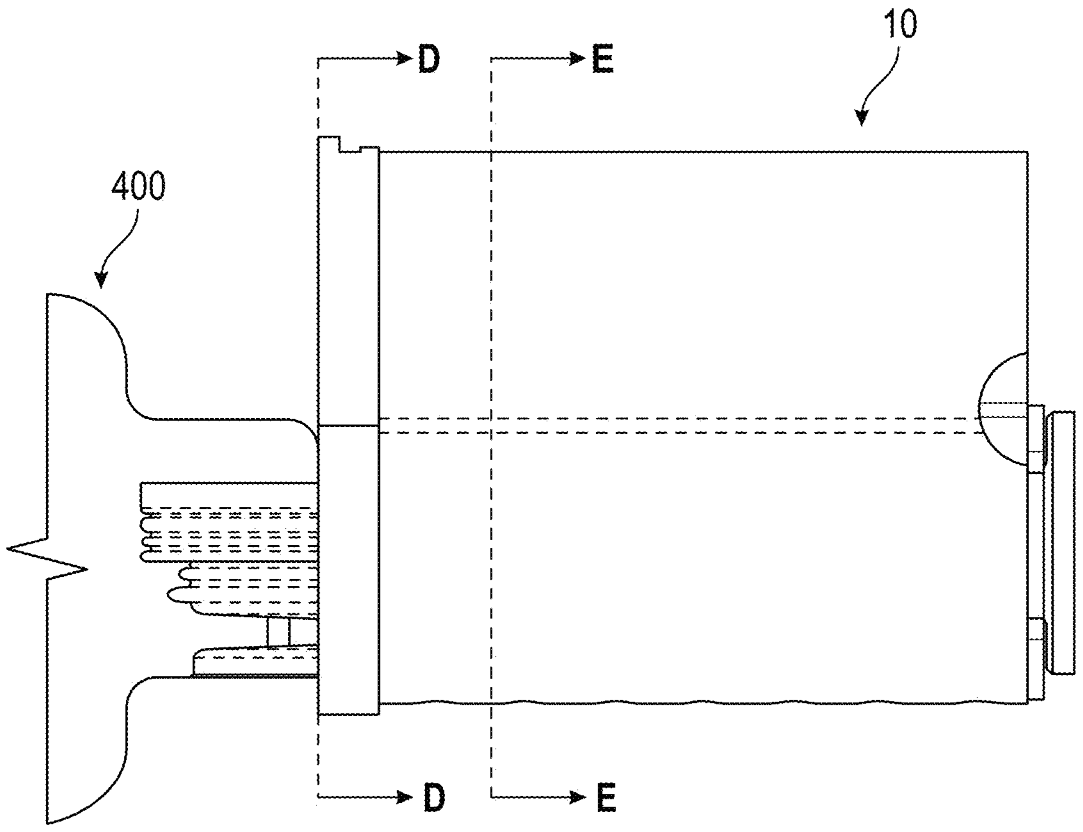
FIG. 42 is a side view of a second level key inserted into a first security level lock.
Figure 44:
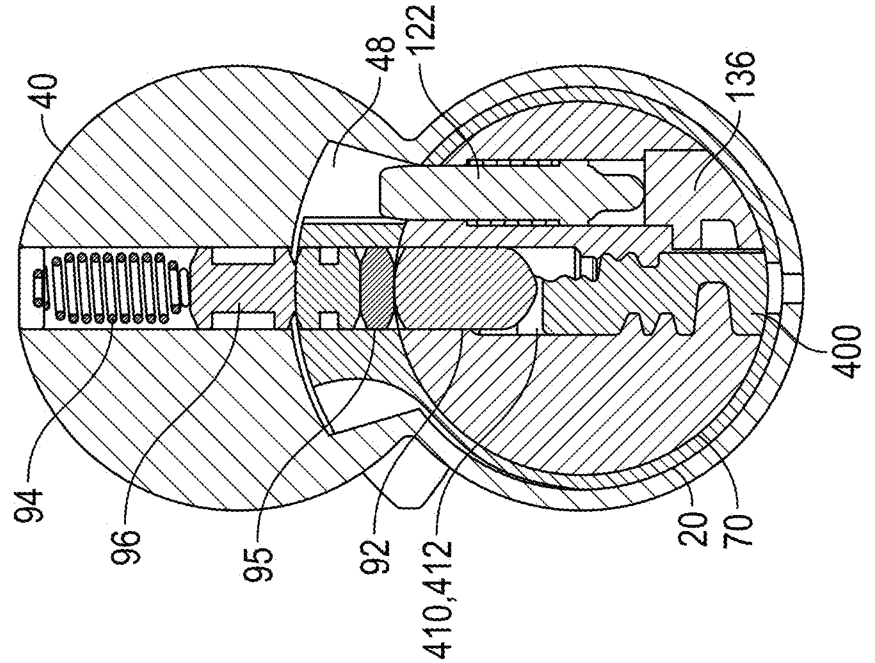
FIG. 44 is a cross section through the second level key and first security level lock along the line E-E in FIG. 42.
Figure 43:
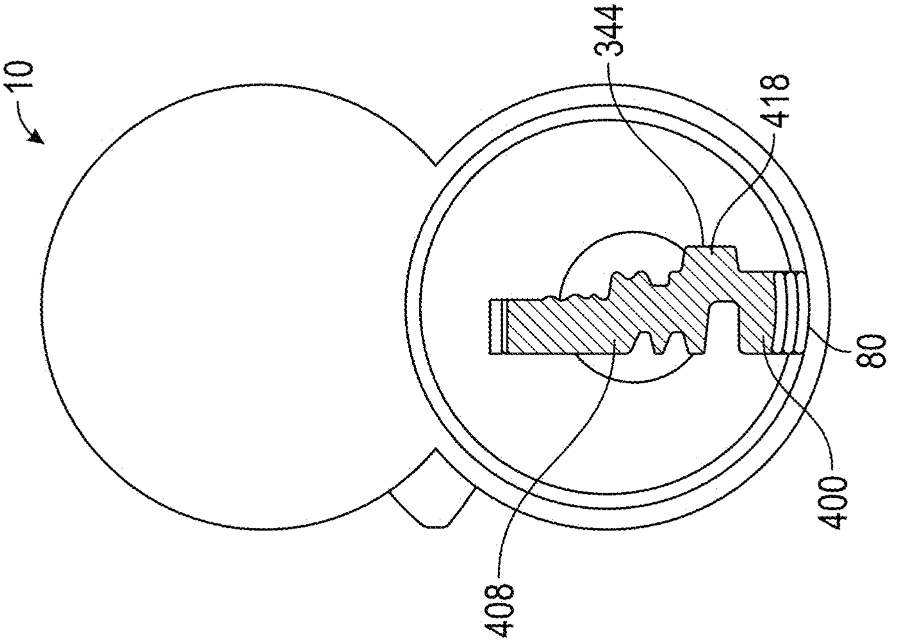
FIG. 43 is a cross section through the second level key along the line D-D in FIG. 42.

FIGS. 42-44 illustrate a second level key 400 inserted into a first security level lock 10. FIG. 42 is a side view of the second level key 400 inserted into a first security level lock 10, FIG. 43 is a cross section through the second level key 400 along the line D-D in FIG. 42, and FIG. 44 is a cross section through the second level key 400 and first security level lock 10 along the line E-E in FIG. 42.

As shown in FIG. 44, second level key 400 has top edge bitting cuts 412 on top edge 410 that elevate each of the tumbler pin assemblies 90 into its unlocked position or configuration in which the interface between one of the master wafers 95 and the bottom pin 92 is aligned with the shear line between the plug 70 and the control sleeve 20. However, as second level key 400 lacks a control rib to move the slider 136 from a first (locked) position to a second (unlocked) position, pin 122 remains in an extended position with the upper shaft of pin 122 extending through the auxiliary pin hole 32 formed in the control sleeve 20 and into the gap 48, so that the pin 122 continues to block the plug 70 from rotating within the control sleeve 20. Therefore, although the primary locking mechanism (e.g., tumbler pin assemblies 90) have been moved to their unlocked positions, the auxiliary locking mechanism (e.g., auxiliary locking pin 122 and slider 136) have not been moved to their unlocked positions and the lock remains locked.

FIG. 43 is a cross-section through the second level key 400 at a front face of the first security level lock 10. As shown, the blocking rib 418 of the second level key 400 blocks access to the control groove 344 of the keyway 80 so that a tool or pick may not be inserted into the control groove 344 to manipulate the slider 136 to its second (unlocked) position while the bitting cuts 412 of the second level lock 400 elevate the tumbler pin assemblies 90 into their unlocked positions.

Figure 46:
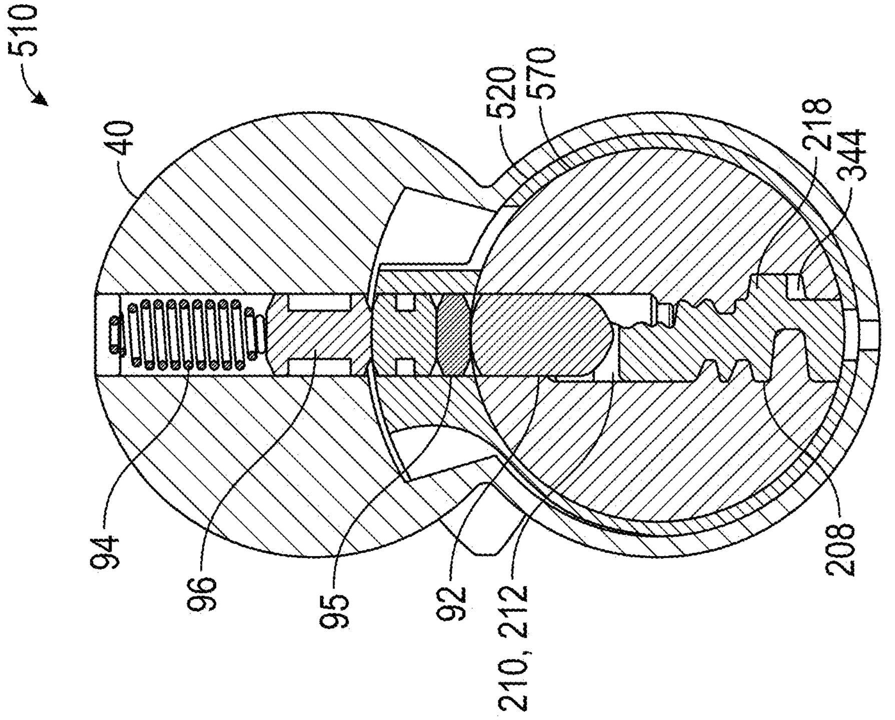
FIG. 46 is a cross section through the second security level lock along the line F-F in FIG. 45.
Figure 45:
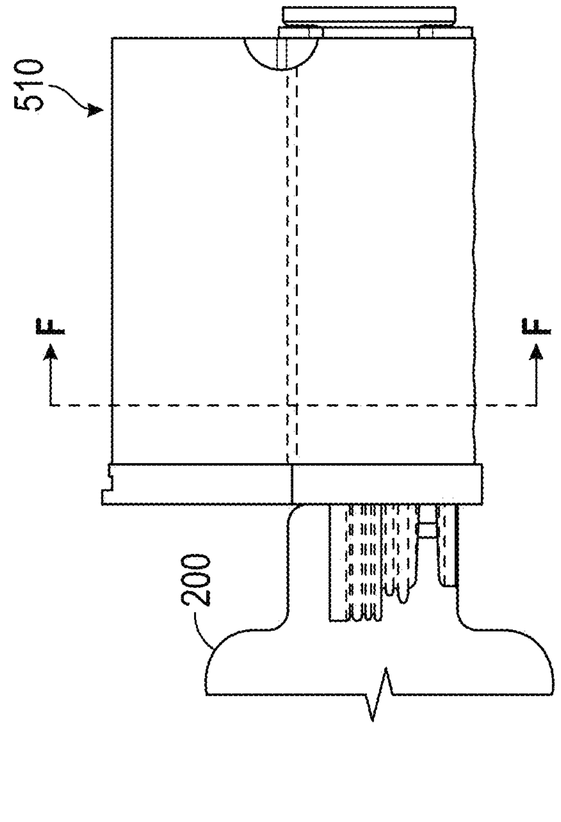
FIG. 45 is a side view of a second level key inserted into a second security level lock.

FIG. 45 is a side view of a first level key 200 inserted into a second security level lock 510, and FIG. 46 is a cross section through the second security level lock 510 along the line F-F in FIG. 45. As shown in FIG. 46, first level key 200 has top edge bitting cuts 212 on top edge 210 that elevate each of the tumbler pin assemblies 90 into its unlocked position or configuration in which the interface between one of the master wafers 95 and the bottom pin 92 is aligned with the shear line between the plug 70 and the control sleeve 20. Second level security lock 510 lacks an auxiliary locking mechanism 120 and slider 136. Nevertheless, keyway 80 of second security level lock 510 includes control groove 344 to accommodate slider control rib 218 (or slider control rib 218*a*) so that a first level key 200 (a master first level key or a limited first level key 200) may be inserted into the keyway 80 to open the second security level lock 510.

While the subject matter of this disclosure has been described and shown in considerable detail with reference to certain illustrative examples, including various combinations and sub-combinations of features, those skilled in the art will readily appreciate other embodiments and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A key blade configured to operate a lock, wherein the lock includes cylindrical plug having an axially-extending keyway and wherein the keyway has a top edge, a bottom edge that is open along an outer surface of the cylindrical plug, and a control groove extending from a side of the keyway and located above the bottom edge of the keyway, a plurality of tumbler pins disposed within tumbler pin holes formed in the cylindrical plug extending radially from the keyway, wherein the plurality of tumbler pins are adapted to control rotation of the cylindrical plug, and an auxiliary locking mechanism including a slider disposed within the cylindrical plug and moveable in an axial direction between a first position in which the auxiliary locking mechanism blocks rotation of the cylindrical plug and a second position in which the auxiliary locking mechanism permits rotation of the cylindrical plug, and wherein the slider includes a control surface disposed within the control groove; wherein the key blade has a top edge, a bottom edge, a first side, and an opposed second side defining a cross sectional shape of the key blade, wherein the cross sectional shape of the key blade is divided into four blade segments between the top and bottom edges for a portion of a length of the key blade, and wherein the four blade segments comprise:

(i) a first blade segment defined by the top edge of the key blade, a lower boundary extending from the first side to the second side of the key blade and located between the top edge and the bottom edge of the key blade, a first side boundary contacting an outermost portion of the first side of the key blade between the top edge and the lower boundary of the first blade segment, and a second side boundary contacting an outermost portion of the second side of the key blade between the top edge and the lower boundary of the first blade segment, wherein the first blade segment has a first width from the first side boundary to the second side boundary of the first blade segment and includes bittings formed along the top edge for positioning the plurality of tumbler pins to permit the cylindrical plug to rotate;

(ii) a second blade segment defined by an upper boundary coinciding with the lower boundary of the first blade segment, a lower boundary extending from the first side to the second side of the key blade and located between the upper boundary of the second blade segment and the bottom edge of the key blade, a first side boundary contacting an outermost portion of the first side of the key blade between the upper boundary and the lower boundary of the second blade segment, and a second side boundary contacting an outermost portion of the second side of the key blade between the upper boundary of the second blade segment and the lower boundary of the second blade segment, wherein the second blade segment has a second width from the first side boundary to the second side boundary of the second blade segment, wherein the second width is greater than the first width, and wherein the second blade segment includes at least one of grooves and ridges extending along at least one of the first side and the second side and conforming to mating grooves and/or ridges formed along a side of the keyway;

(iii) a third blade segment defined by an upper boundary coinciding with the lower boundary of the second blade segment, a lower boundary extending from the first side and the second side of the key blade and located between the upper boundary of the third blade segment and the bottom edge of the key blade, a first side boundary contacting an outermost portion of the first side of the key blade between the upper boundary and the lower boundary of the third blade segment, and a second side boundary contacting an outermost portion of the second side of the key blade between the upper boundary and the lower boundary of the third blade segment, wherein the third blade segment has a third width from the first side boundary to the second side boundary of the third blade segment, and wherein the third width is greater than the second width, and wherein the third blade segment includes a control rib that extends into the control groove of the keyway to contact the control surface of the slider to move the slider from the first position to the second position when the key blade is fully inserted into the keyway; and (iv) a fourth blade segment defined by an upper boundary coinciding with the lower boundary of the third blade segment, the bottom edge of the key blade, a first side boundary contacting an outermost portion of the first side of the key blade between the upper boundary of the fourth blade segment and the bottom edge, and a second side boundary contacting an outermost portion of the second side surface of the key blade between the upper boundary of the fourth blade segment and the bottom edge, wherein the fourth blade segment has a fourth width from the first side boundary to the second side boundary of the fourth blade segment, and wherein the fourth width is less than the third width.

2. The key blade of claim 1, wherein the first side boundary of the second blade segment is coplanar with the first side boundary of the first blade segment, the first side boundary of the third blade segment is coplanar with the first side boundary of the second blade segment, and the first side boundary of the fourth blade segment is coplanar with the first side boundary of the third blade segment.

3. The key blade of claim 1, further comprising a registry groove formed in the first side of the third blade segment, wherein the registry groove is a paracentric groove.

4. The key blade of claim 1, wherein the fourth width of the fourth blade segment is equal to the second width of the second blade segment.

5. The key blade of claim 1, wherein the first blade segment includes one or more grooves and/or ridges extending along a length of the blade along the first side and/or the second side of the blade to define a profile of the blade.

6. The key blade of claim 1, wherein the second blade segment includes one or more grooves and/or ridges extending along a length of the blade along the first side and/or the second side of the blade to define a profile of the blade.

7. A key blank for cutting to form a key to operate a cylinder lock, the key blank having a bow connected to a key blade, wherein the key blade has a top edge for cutting key bits therein, a bottom edge, and opposite first and second sides for receiving grooves and ridges and which define a cross-sectional shape of the key blade, wherein the key blade is divided into four or more segments between the top edge and the bottom edge along a portion of a length of the key blade, and wherein the segments comprise:

a first segment beginning at the top edge of the key blade and having a first width from an outermost part of the first side to an outermost part of the second side within the first segment, wherein the first segment is configured to receive key bitting for positioning a plurality of tumbler pins disposed within tumbler pin holes formed in a cylindrical plug of the cylinder lock;

a second segment adjacent to the first segment and having a second width from an outermost part of the first side to an outermost part of the second side within the second segment, wherein the second segment contains ridges and grooves to conform to ridges and grooves of a profile of the keyway formed in the cylinder plug, and wherein the second width is greater than the first width;

a third segment adjacent to the second segment and having, along a portion of a length of the key blade, a third width from an outermost part of the first side to an outermost part of the second side within the third segment, wherein the third segment includes a control rib that extends into a control groove formed in a side of the keyway to contact a control surface of a slider of an auxiliary locking mechanism of the cylinder lock to move the slider in an axial direction from a first position in which the auxiliary locking mechanism blocks rotation of the cylindrical plug to a second position in which the auxiliary locking mechanism permits rotation of the cylindrical plug, and wherein the third width is greater than the second width; and a fourth segment adjacent to the third segment, terminating at the bottom edge of the keyway, and having a fourth width from an outermost part of the first side to an outermost part of the second side within the fourth segment, wherein the fourth width is less than the third width.

8. The key blank of claim 7, wherein the outermost part of the first side is coplanar within the first, second, third and fourth segments.

9. The key blank of claim 7, wherein the fourth width of the fourth segment is equal to the second width of the second segment.

10. The key blank of claim 7, wherein the third segment includes a registry groove on a side of the blade opposite the control rib, and wherein the registry groove is a paracentric groove.

11. The key blank of claim 7, wherein the first blade segment includes one or more grooves and/or ridges extending along a length of the blade along the first side and/or the second side of the blade to define a profile of the blade.

12. The key blank of claim 7, wherein the second blade segment includes one or more grooves and/or ridges extending along a length of the blade along the first side and/or the second side of the blade to define a profile of the blade.

* * * * *